US012585971B2

(12) United States Patent
Modugula et al.

(10) Patent No.: US 12,585,971 B2
(45) Date of Patent: Mar. 24, 2026

(54) SYSTEMS AND METHODS FOR AUTOMATIC ENVIRONMENTAL PLANNING AND DECISION SUPPORT USING ARTIFICIAL INTELLIGENCE AND DATA FUSION TECHNIQUES ON DISTRIBUTED SENSOR NETWORK DATA

(71) Applicant: KLIMANOVUS LLC, Basking Ridge, NJ (US)

(72) Inventors: Venkata Reddy Modugula, Basking Ridge, NJ (US); Raghuveer Kaushik Vinukollu, New Hope, PA (US)

(73) Assignee: Klimanovus LLC, Basking Ridge, NJ (US)

( * ) Notice: Subject to any disclaimer, the term of this patent is extended or adjusted under 35 U.S.C. 154(b) by 454 days.

(21) Appl. No.: 18/169,565

(22) Filed: Feb. 15, 2023

(65) Prior Publication Data

US 2023/0259798 A1 Aug. 17, 2023

Related U.S. Application Data

(60) Provisional application No. 63/310,774, filed on Feb. 16, 2022.

(51) Int. Cl.
*G06N 5/045* (2023.01)
*G06N 5/022* (2023.01)

(52) U.S. Cl.
CPC ............. *G06N 5/045* (2013.01); *G06N 5/022* (2013.01)

(58) Field of Classification Search
CPC ...................................................... G06N 5/045
See application file for complete search history.

(56) References Cited

U.S. PATENT DOCUMENTS 11,669,794 B2 * 6/2023 Pourmohammad ......................... G06Q 10/0635
705/7.28
2014/0257862 A1 9/2014 Billman et al.

OTHER PUBLICATIONS

Written Opinion of the International Searching Authority in International Application No. PCT/US2023/062667 dated Aug. 20, 2024 (7 pages).

(Continued)

*Primary Examiner* — Ajith Jacob
(74) *Attorney, Agent, or Firm* — FINNEGAN, HENDERSON, FARABOW, GARRETT & DUNNER LLP

(57) ABSTRACT

Disclosed are systems and methods for community-based multi-sensor fused data processing to determine natural hazard risk. In one embodiment, a system comprises one or more memory units storing instructions and one or more processors configured to execute the instructions to receive localized data from a distributed multi-sensor network, the distributed multi-sensor network including a plurality of sensor devices associated with a community, receive property data, community infrastructure data and environmental data from at least one external repository, generate combined data using data fusion, the combined data being based on the localized data from the distributed multi-sensor network and at least one of the property data, community infrastructure data or the environmental data, determine a community risk score for a natural hazard by implementing a machine learning method on the combined data, and perform a mitigating action based on the community risk score.

20 Claims, 11 Drawing Sheets

(56) References Cited

OTHER PUBLICATIONS

Salcedo-Sanz et al: "Machine Learning Information Fusion in Earth Observation: A Comprehensive Review of Methods, Applications and Data Sources", Arxiv.Org, Cornell University Library, 201 Olin Library Cornell University Ithaca, NY 14853, Dec. 7, 2020 (Dec. 7, 2020), XP081834003, DOI: 10.1016/J.INFFUS.2020.07.004.
Ivanka Pelivan Fraunhofer HHI Germany: "Proposal for deliverables document on AI for effective communications; AI4NDM-I-097", International Telecommunication Union, Geneva; Oct. 20 2021.

* cited by examiner

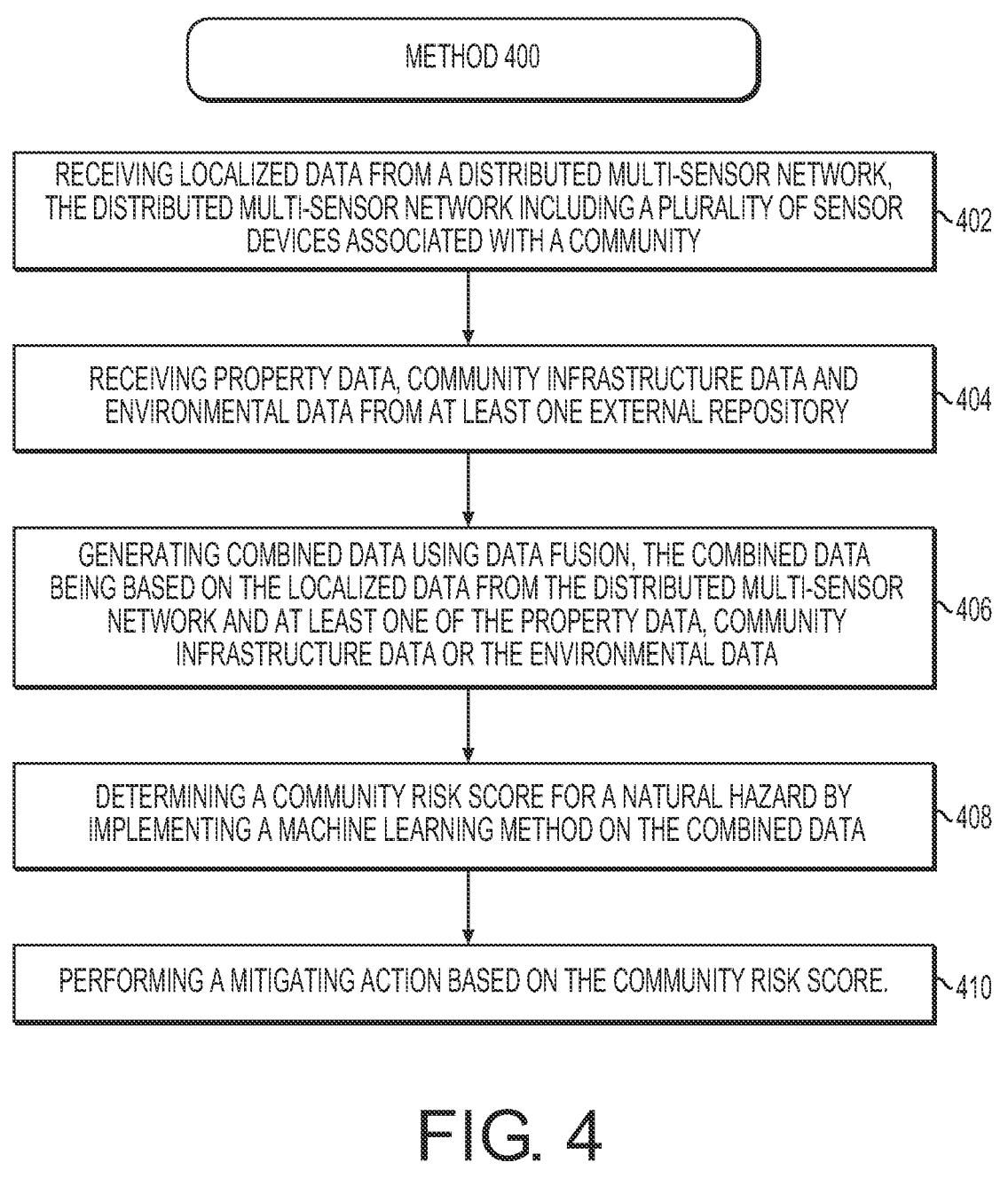

METHOD 400

RECEIVING LOCALIZED DATA FROM A DISTRIBUTED MULTI-SENSOR NETWORK, THE DISTRIBUTED MULTI-SENSOR NETWORK INCLUDING A PLURALITY OF SENSOR DEVICES ASSOCIATED WITH A COMMUNITY ~402

RECEIVING PROPERTY DATA, COMMUNITY INFRASTRUCTURE DATA AND ENVIRONMENTAL DATA FROM AT LEAST ONE EXTERNAL REPOSITORY ~404

GENERATING COMBINED DATA USING DATA FUSION, THE COMBINED DATA BEING BASED ON THE LOCALIZED DATA FROM THE DISTRIBUTED MULTI-SENSOR NETWORK AND AT LEAST ONE OF THE PROPERTY DATA, COMMUNITY INFRASTRUCTURE DATA OR THE ENVIRONMENTAL DATA ~406

DETERMINING A COMMUNITY RISK SCORE FOR A NATURAL HAZARD BY IMPLEMENTING A MACHINE LEARNING METHOD ON THE COMBINED DATA ~408

PERFORMING A MITIGATING ACTION BASED ON THE COMMUNITY RISK SCORE. ~410

FIG. 4

> 6 FEET
< 6 FEET

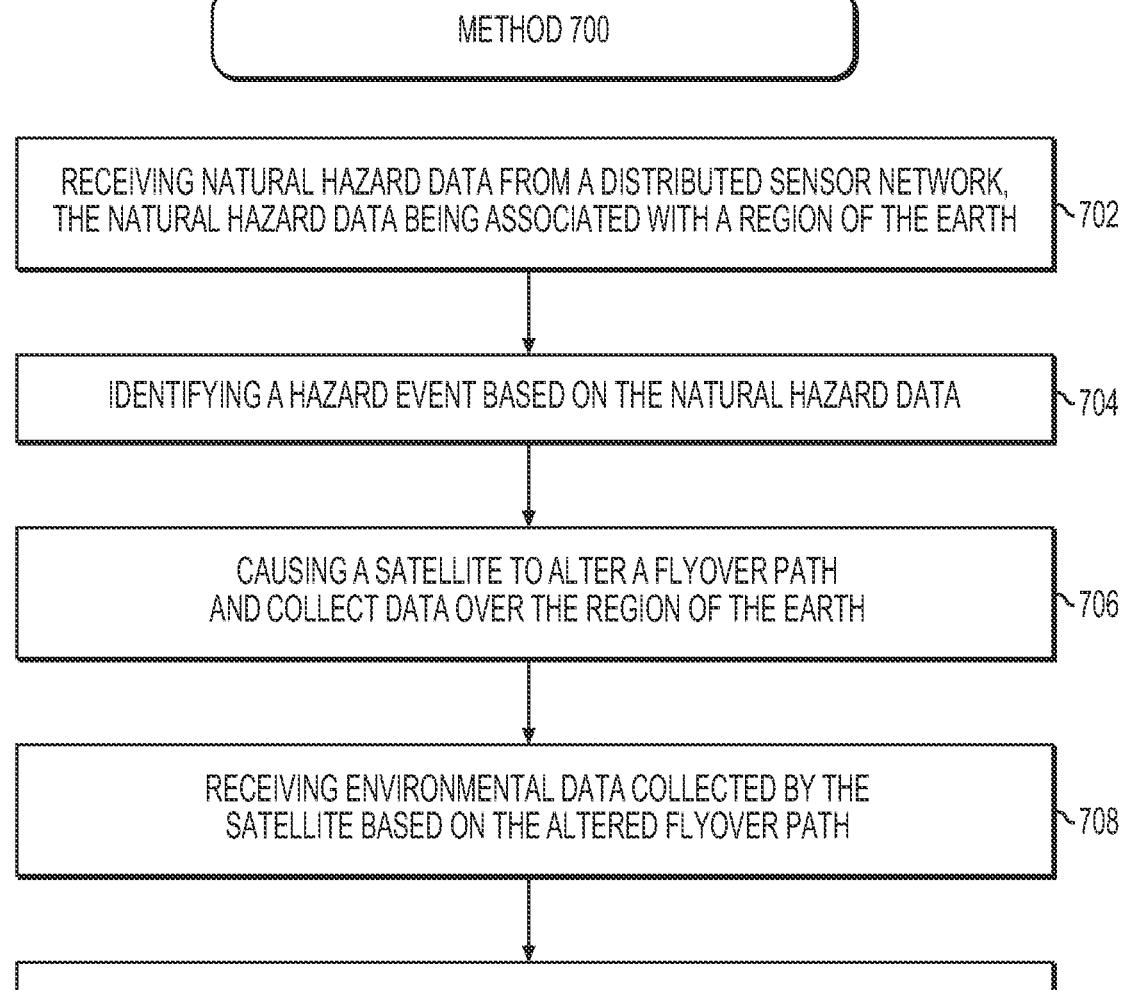

METHOD 700

RECEIVING NATURAL HAZARD DATA FROM A DISTRIBUTED SENSOR NETWORK, THE NATURAL HAZARD DATA BEING ASSOCIATED WITH A REGION OF THE EARTH ~702

IDENTIFYING A HAZARD EVENT BASED ON THE NATURAL HAZARD DATA ~704

CAUSING A SATELLITE TO ALTER A FLYOVER PATH AND COLLECT DATA OVER THE REGION OF THE EARTH ~706

RECEIVING ENVIRONMENTAL DATA COLLECTED BY THE SATELLITE BASED ON THE ALTERED FLYOVER PATH ~708

PERFORMING A FUSION ANALYSIS TO GENERATE A COMBINED DATA SET BASED ON THE NATURAL HAZARD DATA AND THE ENVIRONMENTAL DATA ~710

FIG. 7

SYSTEMS AND METHODS FOR AUTOMATIC ENVIRONMENTAL PLANNING AND DECISION SUPPORT USING ARTIFICIAL INTELLIGENCE AND DATA FUSION TECHNIQUES ON DISTRIBUTED SENSOR NETWORK DATA

PRIORITY CLAIM

The present application claims priority under 35 U.S.C. § 119 to U.S. Provisional Patent Application No. 63/310,774, filed Feb. 16, 2022, titled "TECHNIQUES FOR MANAGING A DISTRIBUTED SENSOR NETWORK FOR AUTOMATIC ENVIRONMENTAL DECISION SUPPORT AND MITIGATING ENVIRONMENTAL RISK USING ARTIFICIAL INTELLIGENCE". The entire contents of the aforementioned application are incorporated herein by reference.

TECHNICAL FIELD

The present disclosure generally relates to computerized systems and methods for managing a distributed sensor network for automatic environmental planning and decision support. In particular, embodiments of the present disclosure relate to inventive and unconventional systems for real-time natural hazard risk assessment and prevention by performing one or more mitigating actions based on the results of a machine learning method.

In addition, the present disclosure generally relates to computerized systems and methods for processing data from satellites and distributed sensor networks. In particular, embodiments of the present disclosure relate to inventive and unconventional systems for performing machine learning fusion analysis on calibrated satellite data to detect natural hazard events in real time.

BACKGROUND

Coastal counties are home to 42 percent of the U.S. population and contribute nearly half of the national GDP. Those people, and the economies they support, are increasingly at risk from sea-level rise, storm surges, erosion, flooding, and saltwater intrusion into aquifers. More than 60,000 miles of roads and bridges within coastal floodplains are vulnerable to storms, and awareness of the need for communities to start retreating from shores and restoring natural flood buffers is growing.

However, an important problem in the field is that existing resources to facilitate risk assessment, such as FEMA maps, are out-of-date or otherwise inaccurate. FEMA/NFIP maps do not consider the changing landscape of hazard risk (e.g., real-time data), thus ignoring climate change. The existing resources are generally binary in nature and are specific to zones and not for individual properties. For example, the answer is binary (yes/no) for a home to be in a Special Flood Hazard Area (SFHA), which determines the requirement of whether the homeowner needs insurance. In addition, hazard risk assessments may be performed by companies, but most property owners are not aware of their hazard risk unless they are shopping for insurance. As a result, hazard risks may be much higher than current estimates indicate using outdated and incomplete resources.

Another problem is that the underlying vulnerability of buildings and properties, which is often unknown or difficult to access, may greatly increase risk above current estimates. For example, otherwise identical flood conditions may have different effects on two buildings with different vulnerability profiles because the vulnerability of infrastructure is multifaceted. The vulnerability may be influenced by the elevation of a building, age, a number of stories, a type of foundation (e.g., crawlspace; basement). Conventional, publicly available flood risk assessments for individual properties are based on flood modeling but do not account for in-situ and vulnerability information of a localized property. In addition, IoTs are not used conventionally to estimate hazard risk (e.g., flood risk) for current and future climates.

Most conventional risk assessment and communication approaches and practices rely on hazard exposure-based risk assessment, which lacks many essential aspects of risk components. Also, the risk analysis used in current practices (like hazard mitigation planning) relies on qualitative rather than quantitative information that leave room for uncertainty in damage analysis. For example, FEMA's 100-year flood map provides information about the locations that will be potentially exposed to a 1% chance of flooding in a year. It does not, however, identify the consequences of this flood on the built environment, such as which building elements will be impacted because information such as building structure and resilience to the hazard is not accurately captured. Vulnerability-based risk assessment can reflect the amount of consequences in terms of damage, loss, and functionality of the built environment. As a result, conventional hazard impact models do not allow risk and resilience based informed decisions.

Currently, there exists no comprehensive vulnerability analysis for counties and cities that accounts for the future state of the climate. As such, the financial impact of present and future climate is unknown. For example, information on whether a home or community was affected by a natural hazard before, the impact, and predictions on what a similar or more severe hazard event would do to the home and/or the community in the future cannot be determined using conventional methods.

To address such issues, there is a need for improved methods and systems for assessing vulnerabilities and/or hazards in real time, generating a risk score based on assessments of the hazard risk and the vulnerability, and performing mitigation actions.

In addition, traditional risk assessment techniques using satellite-based data suffer from challenges. Remote sensing satellites, such as radar satellites, may be used to gather ground data to monitor and predict flooding, fires, and other natural events in real time. Most satellites collect data continuously over a large area as they quickly circle the globe and can provide snapshots of particular areas passed during flyovers (e.g., every hour, every 15 minutes). However, satellite data is prone to inaccuracies, spatial data gaps (e.g., due to cloud cover), and temporal data gaps due to time lags between flyover events. In addition, satellite data may be unavailable during critical times, such as at the time of the peak flood, because a moving satellite may not be positioned to gather data during those times. In addition, satellites gather data using electromagnetic wavelengths (e.g., radar) to sense parameters such as temperature, moisture, or other environmental variables, and these data need to be calibrated with on-the-ground measurements.

Therefore, there is also a need for improved systems and methods for real-time calibration of satellite data with on-the-ground sensor measurements for accurate real-time identification of natural hazard events.

SUMMARY

Aspects of the present disclosure may be directed to a system comprising one or more memory units storing instructions and one or more processors configured to execute the instructions to perform a method for community-based multi-sensor fused data processing to determine natural hazard risk. The method may include receiving localized data from a distributed multi-sensor network, the distributed multi-sensor network including a plurality of sensor devices associated with a community, receiving property data, community infrastructure data and environmental data from at least one external repository, generating combined data using data fusion, the combined data being based on the localized data from the distributed multi-sensor network and at least one of the property data, community infrastructure data or the environmental data, determining a community risk score for a natural hazard by implementing a machine learning method on the combined data, and performing a mitigating action based on the community risk score.

Aspects of the present disclosure may be directed to a method for community-based multi-sensor fused data processing to determine natural hazard risk. The method may include receiving, at an event server, localized data from a distributed multi-sensor network, the distributed multi-sensor network including a plurality of sensor devices associated with a community, receiving, at the event server, property data, community infrastructure data and environmental data from at least one external repository, generating, by the event server, combined data using data fusion, the combined data being based on the localized data from the distributed multi-sensor network and at least one of the property data, community infrastructure data or the environmental data, determining, by the event server, a community risk score for a natural hazard by implementing a machine learning method on the combined data, and performing, by the event server, a mitigating action based on the community risk score.

Aspects of the present disclosure may also be directed to non-transitory computer-readable medium having stored thereon computer-readable instructions that, when executed by a processor, cause the processor to execute a method for community-based multi-sensor fused data processing to determine natural hazard risk. The method may include receiving, at an event server, localized data from a distributed multi-sensor network, the distributed multi-sensor network including a plurality of sensor devices associated with a community, receiving, at the event server, property data, community infrastructure data and environmental data from at least one external repository, generating, by the event server, combined data using data fusion, the combined data being based on the localized data from the distributed multi-sensor network and at least one of the property data, community infrastructure data or the environmental data, determining, by the event server, a community risk score for a natural hazard by implementing a machine learning method on the combined data, and performing, by the event server, a mitigating action based on the community risk score.

Aspects of the present disclosure may be directed to a computerized data fusion method for processing data from satellites and distributed sensor networks. The method may include receiving natural hazard data from a distributed sensor network, the natural hazard data being associated with a region of the earth, identifying a hazard event based on the natural hazard data, causing a satellite to alter a flyover path and collect data over the region of the earth, receiving environmental data collected by the satellite based on the altered flyover path, and performing a fusion analysis to generate a combined data set based on the natural hazard data and the environmental data.

Aspects of the present disclosure may be directed to a data fusion system comprising one or more memory units storing instructions and one or more processors configured to execute the instructions to perform a method for processing data from satellites and distributed sensor networks. The method may include receiving natural hazard data from a distributed sensor network, the natural hazard data being associated with a region of the earth, identifying a hazard event based on the natural hazard data, causing a satellite to alter a flyover path and collect data over the region of the earth, receiving environmental data collected by the satellite based on the altered flyover path, and performing a fusion analysis to generate a combined data set based on the natural hazard data and the environmental data.

Aspects of the present disclosure may be directed to a non-transitory computer-readable medium having stored thereon computer-readable instructions that, when executed by a processor, cause the processor to execute a data fusion method for processing data from satellites and distributed sensor networks. The method may include receiving natural hazard data from a distributed sensor network, the natural hazard data being associated with a region of the earth, identifying a hazard event based on the natural hazard data, causing a satellite to alter a flyover path and collect data over the region of the earth, receiving environmental data collected by the satellite based on the altered flyover path, and performing a fusion analysis to generate a combined data set based on the natural hazard data and the environmental data.

Other systems, methods, and computer-readable media are also discussed herein.

BRIEF DESCRIPTION OF FIGURES

FIG. 4 is an exemplary embodiment of a method for conducting data fusion, determining natural hazard risk, and performing mitigating actions, according to various embodiments.

FIG. 7 is an exemplary embodiment of a method for processing data from satellites and distributed sensor networks and performing mitigating actions, according to various embodiments.

DETAILED DESCRIPTION

Figure 1:
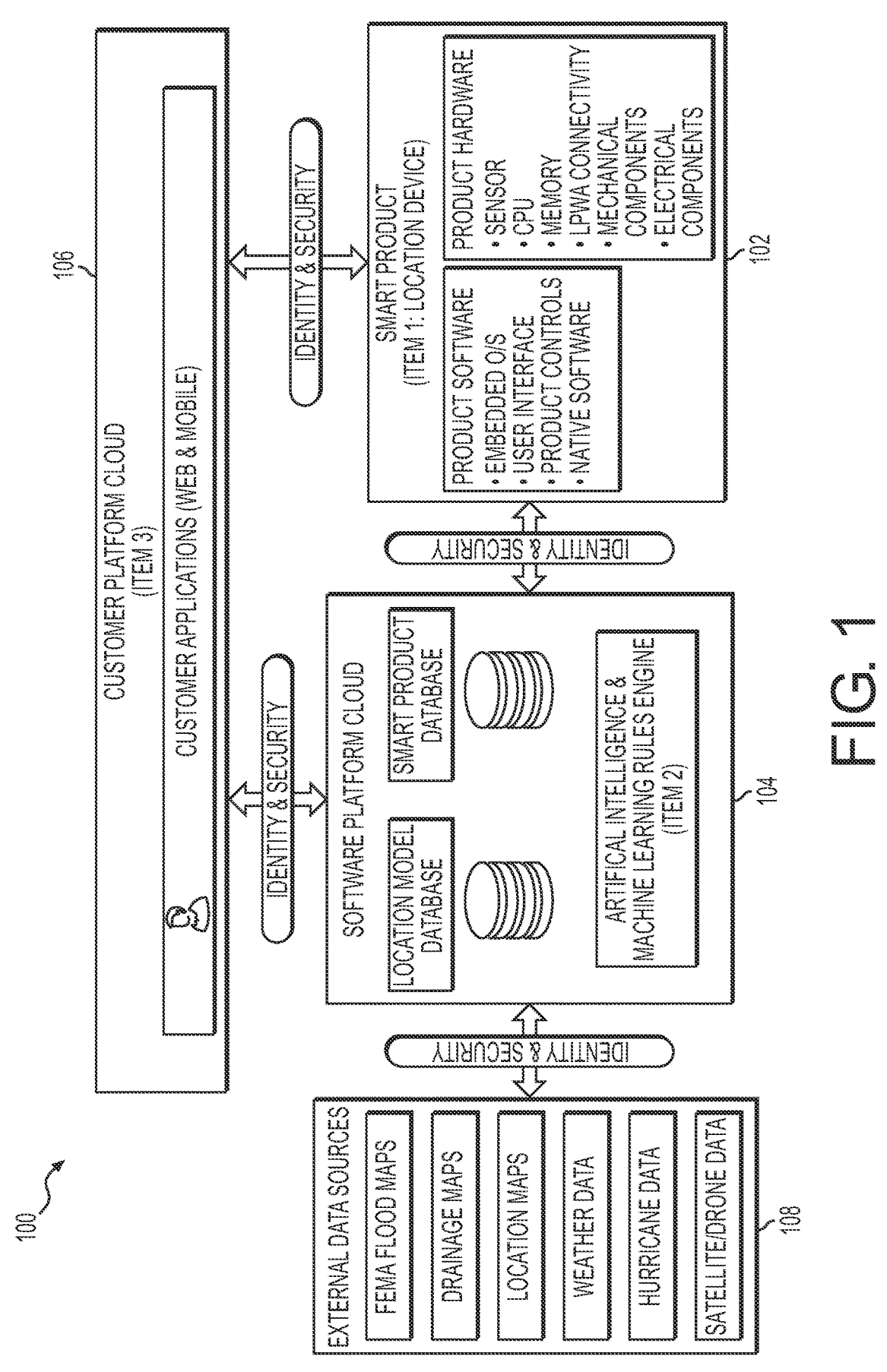
FIG. 1 is a block diagram of an exemplary embodiment of a system for determining a flood risk and performing mitigating actions, according to various embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible.

For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Certain aspects of the present disclosure are directed to systems and methods configured for community-based multi-sensor fused data processing to determine natural hazard risk based on localized data received from a distributed multi-sensor network and property data, community infrastructure data and environmental data received from at least one external repository. The method further includes generating combined data using data fusion, determining a community risk score for a natural hazard by implementing a machine learning method on the combined data, and performing one or more mitigating actions based on the community risk score.

Certain aspects of the present disclosure are directed to systems and methods configured for processing data from satellites and distributed sensor networks by receiving natural hazard data from a distributed sensor network, the natural hazard data being associated with a region of the earth, identifying a hazard event based on the natural hazard data, and causing a satellite to alter a flyover path and collect data over the region of the earth. The method further includes receiving environmental data collected by the satellite based on the altered flyover path and performing a fusion analysis to generate a combined data set based on the natural hazard data and the environmental data.

The disclosed embodiments provide innovative technical features that include using an internet-of-things approach to provide reliable data in real time that can supplement, fuse with, and improve the accuracy of existing data resources. Furthermore, the disclosed embodiments allow for real-time natural hazard risk assessment and prevention in a reliable manner. For example, some disclosed embodiments enable generation of up-to-date and accurate hazard risk scores based on assessments of infrastructure and/or property vulnerabilities. In addition, some disclosed embodiments enable real-time calibration of data to improve data accuracy and real-time assessment of natural hazard events. Additionally or alternatively, disclosed embodiments may use real-time information of the hazard events to dynamically update models by using data assimilation.

Certain aspects of the present disclosure are related to generating improved property risk scores associated with current and future hazard risks in a changing climate. Embodiments may use multiple distributed data inputs, may provide notifications to a property owner or other party, and may trigger automated actions based on the score. The disclosed techniques are readily extendable to many types of risk assessments for natural hazards, including floods, wildfires, and extreme heat. The embodiments may include networked systems comprising distributed sensors, remote data resources, and cloud-based data processing resources executing artificial intelligence methods.

An important problem in the field is that existing resources to facilitate risk assessment, such as FEMA maps, are out-of-date or otherwise inaccurate. By using an internet-of-things approach, the present disclosure provides reliable data in real time that can supplement, fuse with, and improve the accuracy of existing data resources.

Another problem is that the underlying vulnerability of infrastructure is often unknown or difficult to access. Vulnerability relates to the magnitude of potential damage that may be incurred in response to an event. For example, otherwise identical flood conditions may have different effects on two buildings with different vulnerability profiles. Vulnerability of infrastructure is multifaceted. The vulnerability may be influenced by the elevation of a building, age, a number of stories, a type of foundation (e.g., crawlspace; basement). Prior risk scoring systems incorporating vulnerability are unknown. To address this issue, the new techniques described below include assessing vulnerabilities and/or hazards and generating a risk score based on assessments of the hazard risk and the vulnerability.

A risk score as described herein may be based on different future time horizons and may be keyed to hydrological predictions, such as risks associated with a seven-year flood, a one-hundred year flood, and so on, while recognizing that the flood depth associated with these floods is a moving target. It may estimate the likelihood of floods of a certain size and associated damage. As an example, a model may predict the likelihood of a six-inch or 3-foot flood at a property and estimate property damages associated with the flood based on vulnerability, allowing insurance companies to estimate the probability of a claim being filed of a given magnitude. A risk score may include a natural hazard risk score associated with a flood, air quality, wildfire, earthquake, tsunami, rising sea level, extreme heat, storm, or other environmental or geophysical hazard.

Embodiments of the present disclosure may include monitoring and data reporting for periodic or continuous score assessment, enabling the system to respond to triggering events. The system may include triggering a utility pump, for example, based on a determined flood risk. As another example, a triggering event for a first property may include a score or sensor input related to a second property (e.g., a neighbor's, or property for which environmental data are historically correlated). The triggering event may result in, for example, turning a sensor on or off for data collection; contacting an emergency planning agency (e.g., an Office of Emergency Services (OES)) and/or a remote sensing based aerial or satellite service for active regional scale monitoring; implementing a public safety plan (e.g., evacuation, traffic management actions); alerting a third party of a possible change in a risk score (e.g., alerting a lender); or other mitigating actions. Additional examples of mitigating actions include shutting off a water line, shutting off power, triggering a utility (e.g., a sump pump), warming up a generator, providing recommendations, and more. The action may be customized based on user profile data (specifying presence of a backup generator, pump, or other equipment) and may utilize machine learning techniques to predict actions based on past (e.g., manually selected) actions given a set of circumstances.

Additionally or alternatively, embodiments may provide benefits such as enabling embedded insurance coverage options for flood, determining flood depth information during and after a flood event, informing insurance companies about flood depth and damage using the platform, determining historical flooding in the area, and identifying where and when floods occur, in real time.

Sensors according to the embodiments herein may include a comprehensive apparatus or system for a property comprising a combination of sensors (e.g., flood, moisture, and water leak).

With a blend of information from catastrophe models and location intelligence, embodiments of the present disclosure may include computing and communicating a flood risk of a property and/or land parcel.

FIG. 1 illustrates an exemplary system 100 for determining a flood risk of a property and/or land parcel by blending information from catastrophe models and location intelligence. System 100 may include one or more location devices 102, location/artificial intelligence (L/AI) models 104, customer platform 106, and external data sources 108 connected to one another via one or more networks.

Location devices 102 may be any devices (e.g., customer device, smart device, or other computerized system) configured to monitor and collect ground level weather condition data and/or local property information. Additionally, location devices 102 may be configured to communicate with L/AI models 104 and/or customer platform 106. In some embodiments, one or more location devices 102 may include a flood risk sensor configured to communicate localized information with hybrid catastrophe models to obtain real time information for generating risk scores and flood alerts. For example, one or more location devices 102 may include one or more of a global positioning system (GPS) sensor, pressure level sensor(s) to capture the elevation profiles of the property, water sensor(s) to detect water leaks or flood water entry into the house, moisture sensor(s), temperature sensor(s), and/or LoRa sensor(s) for communication. In some embodiments, location devices 102 may be part of a larger climate-responsive networked system that communicates information from various sensors in the near network and aids in decision making.

L/AI models 104 may include one or more artificial intelligence and machine learning rules engines, one or more location model databases, and one or more smart product databases. In some embodiments, L/AI models 104 may be trained over time using one or more feedback loops. For example, flood depth data from one or more location devices 102 may be used to train L/AI models 104. In some embodiments, L/AI models 104 may be located on a cloud platform. Additionally or alternatively, L/AI models 104 may be configured to receive data from location device 102 and external data sources 108. Based on the received data, L/AI models 104 may be configured to compute one or more risk scores and send the computed one or more risk scores to customer platform 106. In some embodiments, L/AI models 104 may be configured to communicate computed risk scores to customer platform 106 in real time.

Customer platform 106 may comprise a platform configured to allow users (i.e., customers) to access and view data via mobile/web applications. For example, customer platform 106 may be configured to update property risk information in real time based on data received from location devices 102 and/or L/AI models 104. The updated property risk information may be displayed via a graphical user interface of a user device associated with a user in response to receiving user input (e.g., selection, click, or other actions). Customer platform 106 may be configured to reformat the data into an understandable version for the user. This allows users to understand risks associated with their property and make necessary choices.

External data sources 108 may include data stored in one or more external repositories. For example, external data sources 108 may include at least one of FEMA flood maps, drainage maps, location maps, weather data, hurricane data, satellite data, and/or drone data. In some embodiments, external data sources 108 may be configured to store real-time data and/or real-time risk scores. In some embodiments, external data sources 108 may include historical data regarding events that have happened in the past.

In some embodiments, system 100 may be adaptable for determining different types of risk. For example, system 100 may be configured to determine wildfire risk. Wildfire risk may be associated with vulnerabilities such as vegetation conditions (coverage, type, presence of buffer areas, or other characteristics relating to vegetation). Vulnerabilities may also include building material types, age, or other property characteristics. In the embodiments described herein, distributed sensor data and other data sources may be used as model inputs to identify a buffer area, or lack thereof, of vegetation. Other data sources may include third party mapping data (e.g., Google Maps™), lidar sensor data, user input, and others. A risk score may be used to determine wildfire risk or provide recommendations for brush cleaning or vegetation management. System 100 may include blending drone images or high-resolution satellite data to determine vulnerability or risk of wildfires.

More generally, a risk score of the embodiments described herein can be a function of hazard and vulnerability. Climate change, for example, can influence this with extreme events including flash flooding, extreme heat and droughts. As an example, a 100-year flood event previously produced 6 inches of water at a location, but today it produces two feet of water. The hazard is much larger, and a risk score is now 8 where it used to be 3. Similarly extreme drought conditions can lead to increase in frequency and severity of wildfire events.

In some embodiments, system 100 may run a model using the location of a home and information that comes from a sensor (e.g., location devices 102) in the home as input. The system may implement a climate hazard model or flood model (e.g., L/AI models 104). Other inputs may include a first-floor elevation, elevation above grade, and sea level, for example. The model may also accept as input historical data regarding events that have happened in the past and predict events that can happen in the future based on climate risk. It may use that information to derive a risk score.

The model may use physical characteristics as input. For example, it may input temperature increases, moisture holding capacity increases, precipitation increase, and more.

System 100 may implement a damage model by running an engineering model to interpolate and extrapolate, based on historical events, a statistical model, and available data. Then, received sensor data may be used to auto-calibrate the model.

Vulnerability may be measured in different ways. For example, a flood depth to property damage curve may be an indication of vulnerability. Vulnerability may apply to roads, a set of homes, or other infrastructure.

A vulnerability model may need to be interpolated using machine learning (e.g., recurrent neural network or convolutional neural network models) and/or fragility functions. Training data may include loss data collected by industry—e.g., some public, some private.

Internet-of-things techniques can be employed to collect information and send notifications in a variety of fields. By monitoring information in a home, a homeowner may receive confirmation that systems are normal or that problems are rare and not serious (e.g., a power supply voltage fluctuation of one time per month may not be a concern). But embodiments may identify problems using rules (e.g., identify a voltage fluctuation that occurs three times in one day) and execute a mitigating action (e.g., initiate a dispatch of personnel to address the problem).

The disclosed embodiments can combine catastrophe models, climate models, and sensor data in a home. This architecture allows real time monitoring and real time modeling at local or regional levels. This may allow a homeowner to assess potential risk, for example. It may provide more accurate and granular predictions and forecasts (e.g., predicting one block may incur high flood damage, while a nearby block may incur little or no damage in the same event).

Based on data from the distributed networks and/or analysis by the system, embodiments may include updating models, performing a mitigating action, sending a notification, configuring a sensor, or others.

In some embodiments, a computerized method for using artificially intelligent forecasting to mitigate natural hazard risk may comprise: receiving natural hazard data associated with a location from a distributed sensor network; receiving vulnerability data associated with the location from a data repository; using an artificial intelligence algorithm to determine a natural hazard risk score associated with the location, the natural hazard risk score being based on the natural hazard data and the vulnerability data; and performing a mitigating action based on the natural hazard risk score.

In some embodiments, a computerized method for managing a distributed sensor network for automatic environmental planning and decision support may comprise: receiving hazard data from a remote sensor at an environmental beacon device associated with a property; transmitting the hazard data to an event server; receiving a notification from the event server indicating a risk score based on the hazard data; transmitting an instruction to the remote sensor, the instruction comprising a data collection setting; and receiving updated hazard data, the updated hazard data being collected based on the data collection setting.

In some embodiments, a computerized method for multi-sensor fused data processing to determine natural hazard risks at an event server may comprise: receiving, at the event server, localized data from a distributed multi-sensor network, the distributed multi-sensor network including a plurality of sensor devices associated with respective properties; receiving, at the event server, at least one of property data or environmental data from an external repository; generating, by the event server, combined data using data fusion, the combined data being based on the localized data from the distributed multi-sensor network and the at least one of property data or environmental data; determining, by the event server, a natural hazard risk score by implementing a machine learning method on the combined data; and performing, based on the natural hazard risk score, at least one of a mitigating action or transmitting a notification to a user device.

In some embodiments, a computerized method for processing event data may comprise: receiving hazard data collected by a first sensor device associated with a first property; selecting an event model based on the hazard data; executing the event model to determine a risk score associated with the first property based on the hazard data; identifying a second sensor device associated with a second property based on a spatial relationship between the first property and the second property; and updating a data collection setting on the second sensor device.

In some embodiments, selecting a model may be based on a user profile associated with the hazard data, based on a threshold or other rule associated with data (e.g., temp above/below a threshold, precipitation above threshold duration or quantity), a location of the hazard data (e.g., data indicating a fire risk in some areas and flood risk in others, or any other data indicating a hazard in an area).

In some embodiments, a spatial relationship may include upstream and downstream relationships, wind direction, elevation, distance, or other characteristics related to space. The relationship could be a statistical relationship based on a classification of a property (e.g., building code), a relationship determined by artificial intelligence, or other types of calculated relationships between data.

In some embodiments, techniques may include: sending notifications (e.g., evacuation notices or informing a third party such as a neighbor of potential impact) or performing a mitigating action.

In some embodiments, a computerized method for processing event data may comprise: receiving initial hazard data collected by a sensor device associated with a property; selecting an event model based on the initial hazard data; executing the event model to determine a risk score associated with the property based on the initial hazard data; receiving updated hazard data from the sensor device; and updating the selected event model based on the initial hazard data and the updated hazard data.

In some embodiments, initial hazard data may include at least one of elevation data, precipitation data, moisture data, storm surge data, wind data, pressure data, temperature data, or GPS data. Additionally or alternatively, initial hazard data may include real time data collected at a sensor associated with the location. Additionally or alternatively, initial hazard data may include historical sensor data.

Embodiments may further comprise retrieving additional hazard data from a database, the retrieving being based on the initial hazard data.

Embodiments may further comprise receiving climate prediction data, and wherein the risk score is further based on the climate prediction data.

In some embodiments, the distributed sensor network may include a sensor mounted to a building.

Embodiments may further comprise vulnerability data including an indication of at least one of a building condition, a building material, a building age, a building size, or any other building engineering characteristic.

Embodiments may further comprise receiving additional vulnerability data associated with the location from the distributed sensor network, wherein the risk score is further based on the additional vulnerability data.

In some embodiments, the data repository may be one of a local repository, a cloud storage, a website, or a remote database.

In some embodiments, the machine learning model may include a hazard model and a vulnerability model.

In some embodiments, the model may be a machine learning model and using the model to determine the risk score associated with the location may include providing the initial hazard data and the vulnerability data as inputs to the machine learning model. Embodiments may further comprise training the model to generate a risk score using historical hazard data, historical vulnerability data, and historical event data.

In some embodiments, using the model to determine the risk score associated with the location may include generating synthetic event data based on historical hazard data. Embodiments may further comprise fitting a probabilistic distribution to the synthetic event data. Embodiments may further comprise updating the synthetic event data based on the received hazard data.

In some embodiments, using the model to determine the risk score associated with the location may include generating a damage curve based on historical event data and historical vulnerability data. Embodiments may further comprise updating the synthetic event data based on received climate prediction data.

In some embodiments, external data sources may be used as model inputs (user input data, external data repository data).

In some embodiments, vulnerability data may be used as model input.

Embodiments may further comprise updating a heat map based on model result.

Embodiments may further comprise notifying an emergency responder.

Embodiments may further comprise receiving data from the second sensor device and triggering a mitigation action Certain aspects of the present disclosure are related to techniques for a property owner to assess elevation-based risk and, for example, obtain an elevation certificate for insurance purposes (e.g., a property-owner do-it-yourself process). Today, certificates may be purchased to obtain flood insurance (that incorporates the local in-situ elevation information) from FEMA. Property owners must obtain elevation certificates from a professional land surveyor that evaluates the property. The certificate may be based on property elevation as compared to the base flood elevation. By involving a third party, the traditional certification process helps prevent fraud where property owners may otherwise misrepresent elevation to obtain a lower insurance premium. Certain aspects of the present disclosure allow property owners to self-report elevation while validating elevation data to prevent such fraud.

Embodiments may include a process for mapping the elevation profiles of the property and land parcel. The resulting data may be reviewed by a land surveyor to attest and generate an elevation certificate, or it may be used to automatically generate a certificate.

Embodiments may include installing a sensor on a lower floor to determine its elevation, and determining a flood risk and/or a flood certification rating. Embodiments may include employing models to determine a flood risk and/or certification.

Data collected in the embodiments described herein can be combined with other data sources (e.g., public data (LIDAR) or other elevation data) to accurately determine risk.

The model output may be used to determine insurance pricing based on a level of underlying risk, resulting in better premium decisions.

Based on the sensor it may be determined whether a building code requirement was met (e.g., whether a base flood elevation condition was satisfied), and a government agency may be notified.

Sensors may be pre-calibrated. Values obtained outside a threshold may result in an automatic remeasurement. This may be helpful in detecting error or fraud (e.g., if a measured ground floor elevation is higher than expected because a homeowner improperly installed the device on a second floor). Based on a threshold, the system may determine whether an inspection or recalibration is needed. That determination may be based on historical data (e.g., retrieving public records and determining when a previous inspection was conducted).

More generally, embodiments may include measuring a first floor elevation, determining the difference between the first floor elevation and one or more ground elevations (e.g., ground elevations of one or more building corners, a building perimeter, or a building boundary), and determining a flood risk (e.g., using methods as described herein). Example methods according to the embodiments are illustrated in the below figures.

Figure 2A:
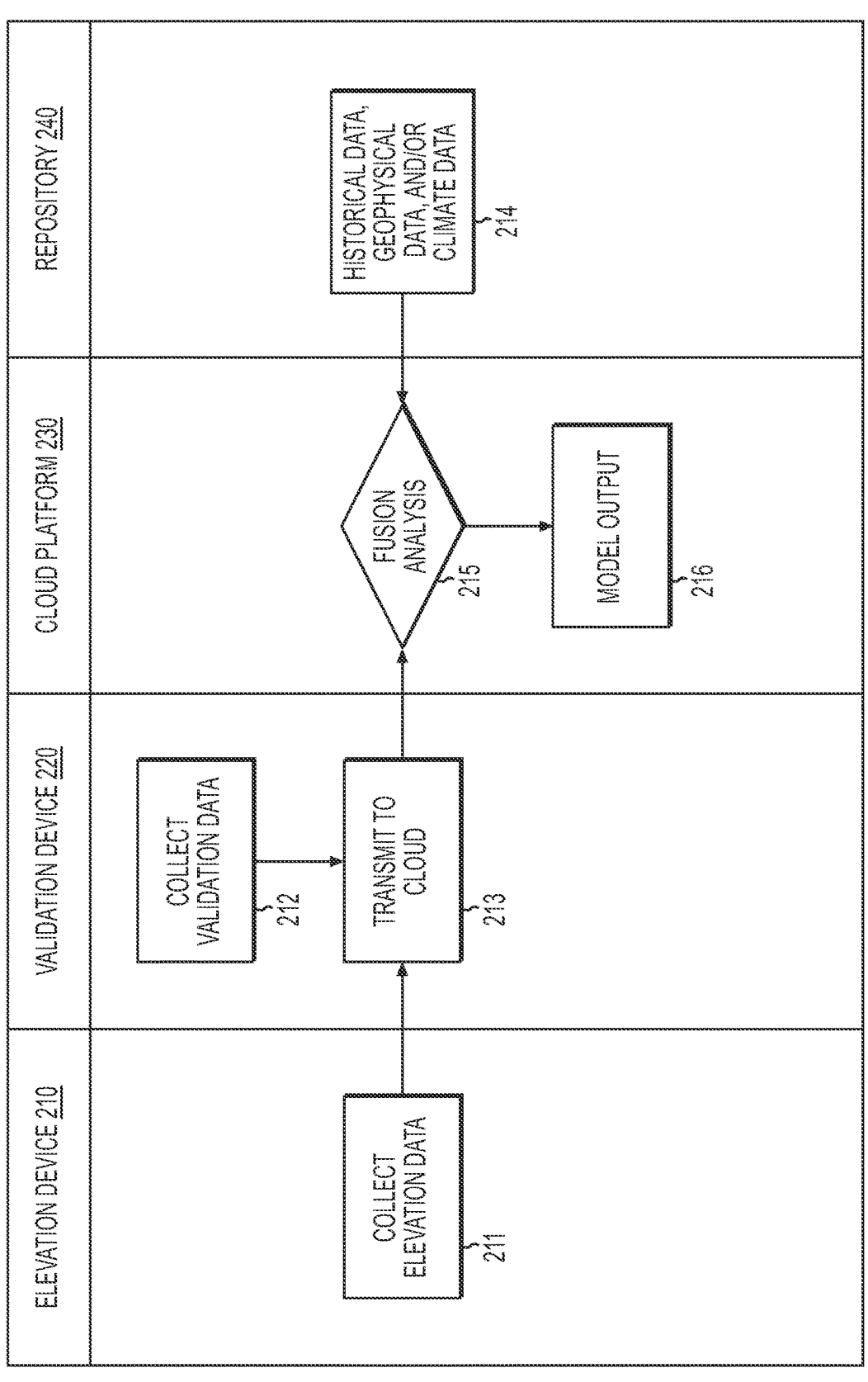
FIGS. 2A, 2B, 2C, 2D and 2E are flow diagrams illustrating exemplary embodiments for conducting data fusion, and assessing elevation-based risk and performing mitigating actions, according to some embodiments.
Figure 2B:
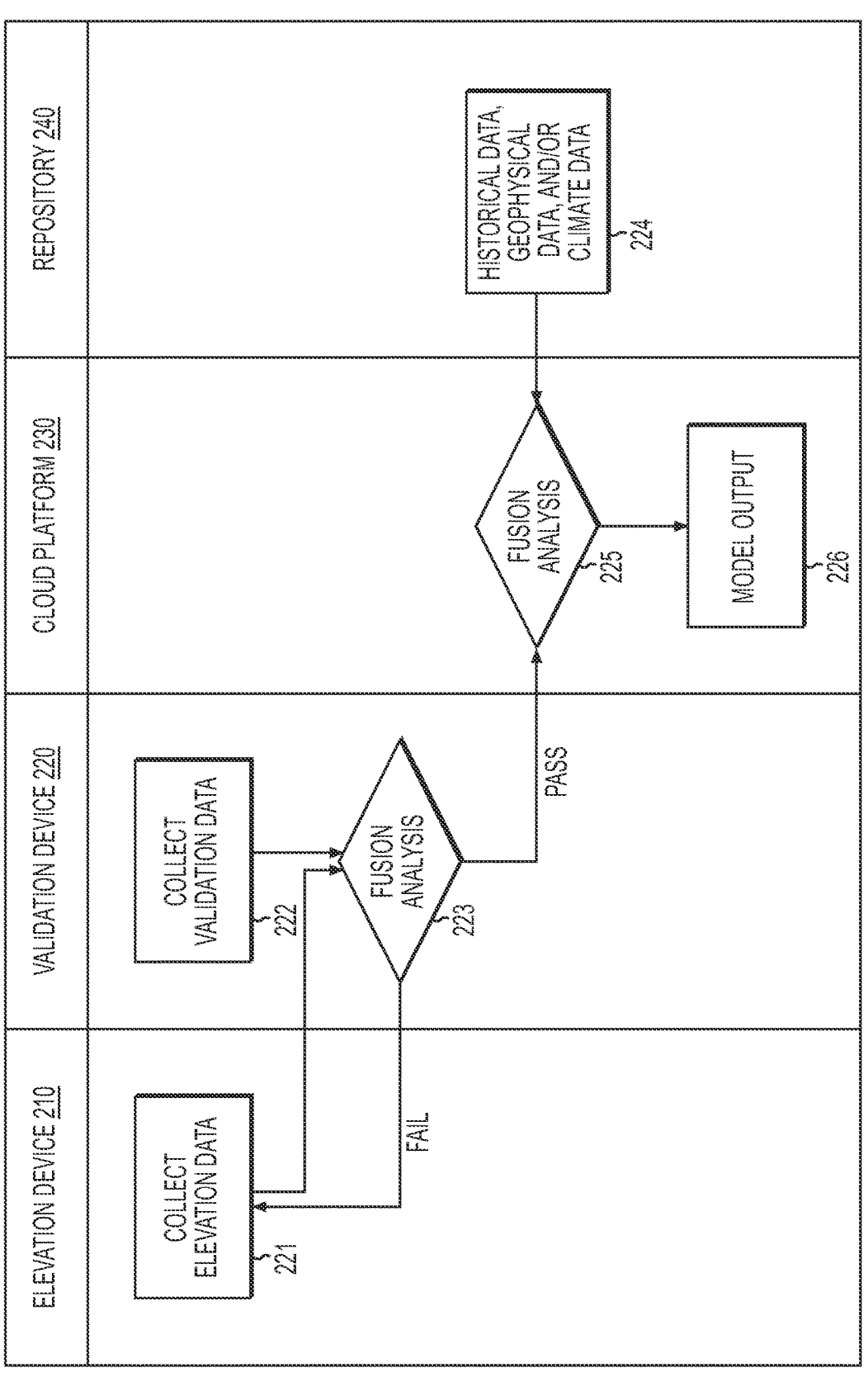
Figure 2C:
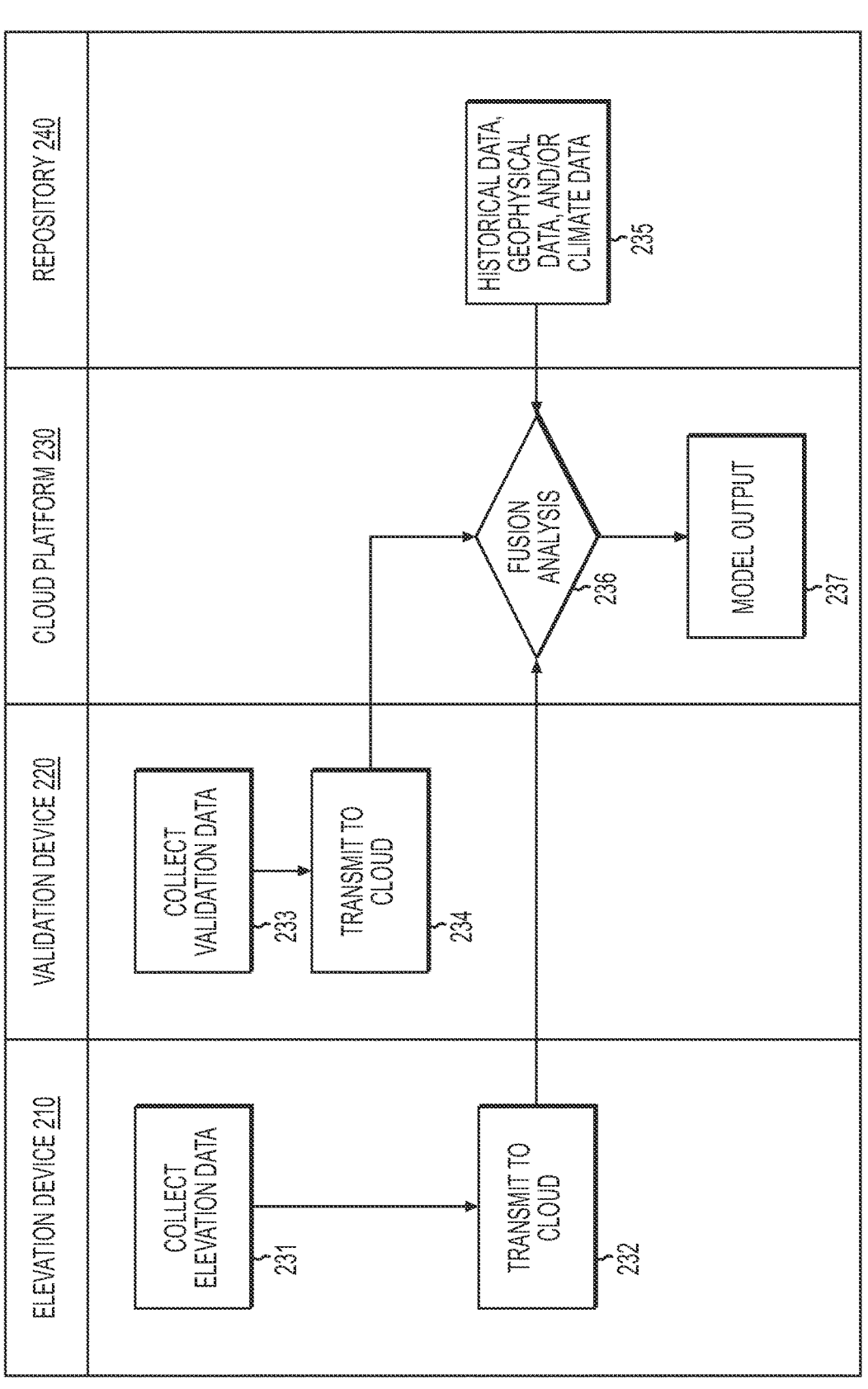
Figure 2D:
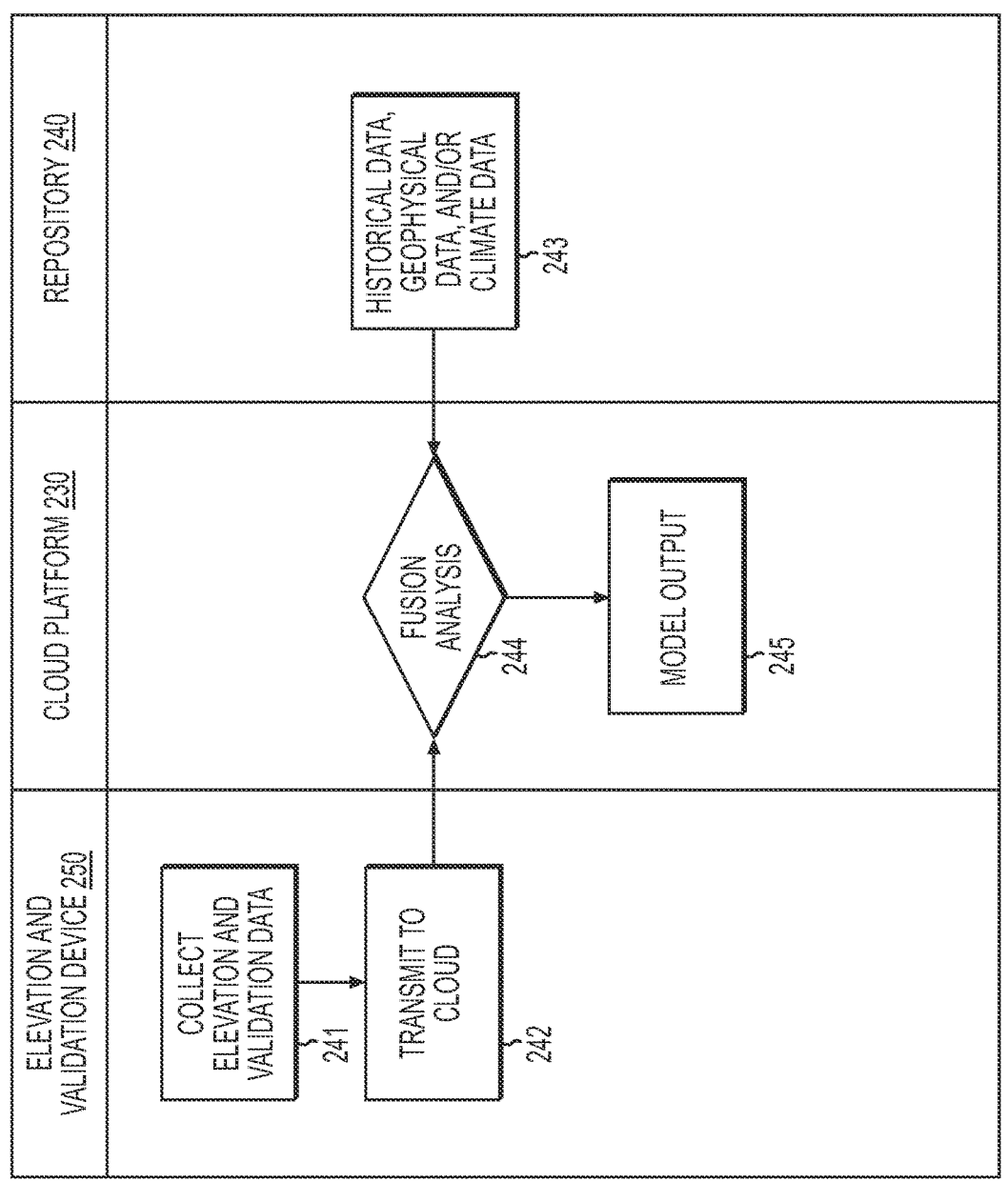

FIGS. 2A-2E are flow diagrams of exemplary methods for assessing elevation-based risk, consistent with disclosed embodiments. In some embodiments, as shown in FIGS. 2A-2C and 2E, a system for assessing elevation-based risk may include one or more elevation devices 210, one or more validation devices 220, a cloud platform 230, and one or more repositories 240. In some embodiments, as shown in FIG. 2D, a system for assessing elevation-based risk may include one or more combined elevation and validation devices 250, cloud platform 230, and one or more repositories 240.

Embodiments may include one or more elevation devices 210, wherein elevation device 210 may be a user device configured for use by a lay person. The elevation device may be configured to collect elevation data, position data (e.g., GPS data), and other sensor data (e.g., steps 211, 221, 231, and 252 of FIGS. 2A-2C and 2E, respectively). The elevation device may include an altimeter or other pressure-based elevation sensor. It may have a user interface (e.g., a GUI, buttons, and/or a display), a processor, and/or memory. The elevation device may be configured to transmit data to a cloud platform (e.g., steps 213, 232, 255 of FIGS. 2A, 2C and 2E, respectively) and/or to a validation device, as disclosed herein.

Embodiments may include one or more validation devices 220. A validation device may be an IoT device associated with a building or an object, a mobile phone, a tablet, a computer, or other user device. The validation device may be capable of collecting image data, spatial data (e.g., via a lidar), position data (e.g., GPS data), or other validation data (e.g., steps 212, 222, 233, and 254 of FIGS. 2A-2C and 2E, respectively). It may have a user interface (e.g., a GUI, buttons, and/or a display), a processor, and/or memory.

The validation data may be used to validate a measurement by an elevation device (e.g., step 223 of FIG. 2B). For example, validation data may include a picture and time stamp that may be cross-referenced to a time-stamped elevation measurement, and the picture may be analyzed at the cloud using machine learning methods or other image processing techniques to confirm whether the elevation device was located in an appropriate position (e.g., validate that a measurement is associated with a ground floor elevation of a building corner, associated with a first floor elevation, associated with a building perimeter, or associated with locations of other building features.).

Figure 2E:
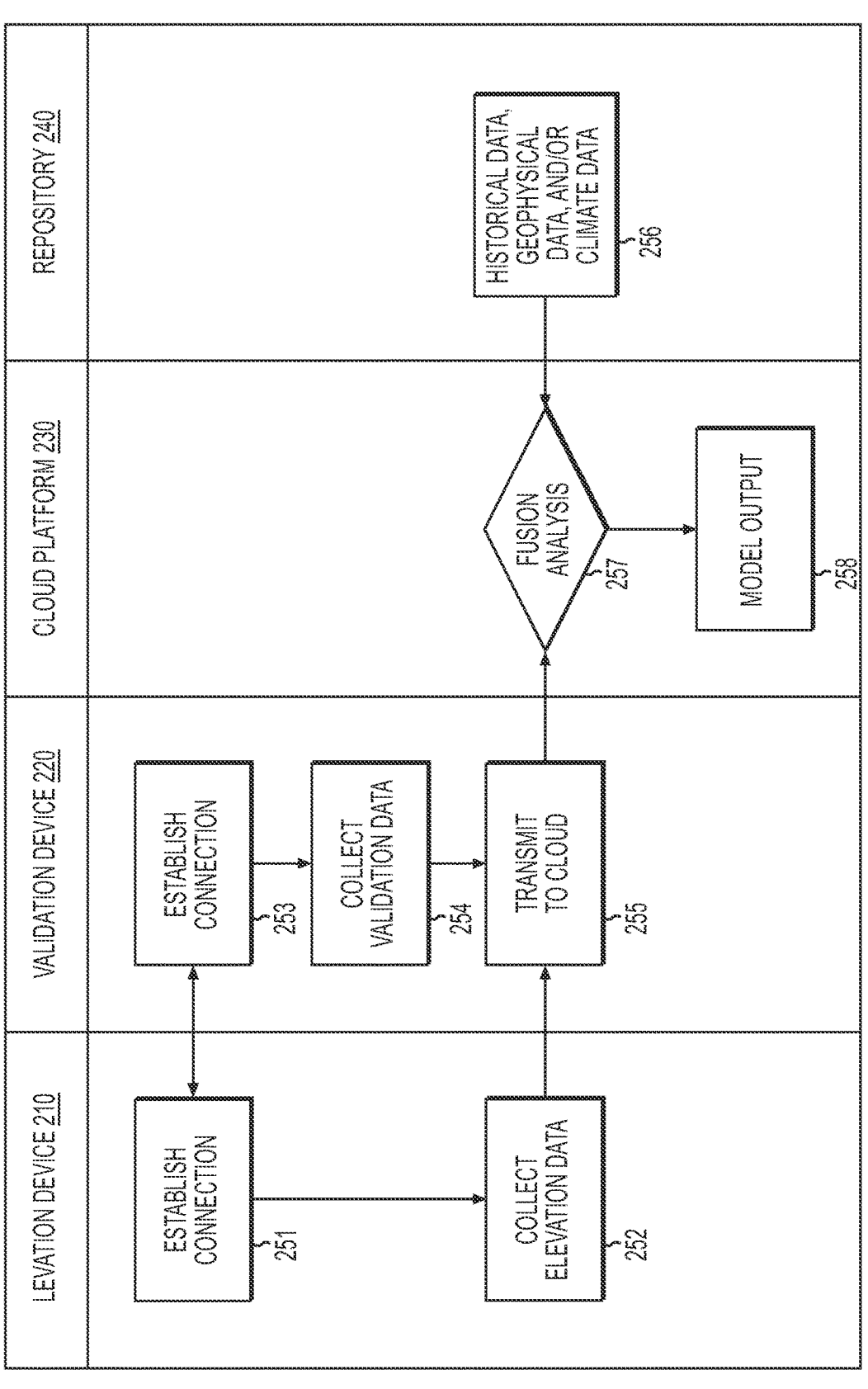

The validation device may be configured to transmit received data and/or sensed data to a cloud platform (e.g., steps 213, 234, 255 of FIGS. 2A, 2C and 2E, respectively). In some embodiments, the validation device may serve as an internet hotspot or gateway device for connecting an elevation device to the cloud.

In some embodiments, a validation device and elevation device establish a connection (e.g., via a local network, through Bluetooth, or other means of wireless connectivity) to coordinate data collection on each device and/or to verify that the devices are physically located near to each other (e.g., steps 251 and 253 of FIG. 2E). For example, using the connection, the devices may exchange identifying information (e.g., serial numbers) and store that information for a validation analysis. Using the connection, a validation device may prompt an elevation device to collect and transmit elevation data in response to the prompt. In some embodiments, a validation device may collect validation data while a connected elevation device obtains elevation data.

Some embodiments may include one or more combined elevation and validation devices 250 configured to collect elevation data and validation data (e.g., step 241 of FIG. 2D). Additionally or alternatively, a combined elevation and validation device 250 may be configured to transmit the collected data to a cloud platform (e.g., step 242 of FIG. 2D).

In some embodiments, a user may receive instructions to perform a validation method via a display of the one or more elevation devices 210 or the one or more validation devices 220 or via other means (e.g., audible instructions via a speaker, instructions via a messaging platform such as text or email). Elevation validation methods of the embodiments may include collecting elevation and/or position data associated with a building. For example, an elevation device may collect elevation and/or position data at one or more corners of a building. Embodiments may include collecting elevation and or position data as a user travels a perimeter of a building (e.g., by walking). A user may input data to an elevation or validation device to confirm elevation information (e.g., associate measurements with a building wall, a corner, a perimeter, or an obstacle).

Cloud platform 230 may analyze received elevation and validation data using machine learning models, image processing techniques, or other models. For example, image data may be analyzed to identify an elevation device and its proximity to a building feature (e.g., a wall, a floor, a corner, an exterior doorway, a window, or other architectural structure) to confirm whether the elevation device was located in an appropriate position (e.g., validate the measurement is a ground floor elevation of a building corner, a first floor elevation, or other locations of other building features). Cloud platform 230 may analyze time data associated with elevation and validation data to confirm elevation data and time data. Models may be trained to accept inputs and determine whether elevation data are valid.

Cloud platform 230 may access or receive property data or natural hazard data, from repository 240 (e.g., steps 214, 224, 235, 243, 256 of FIGS. 2A-2E, respectively), and use these data to conduct a fusion analysis to validate elevation data (e.g., steps 215, 225, 236, 244, 257 of FIGS. 2A-2E, respectively). For example, the fusion analysis may compare elevation data collected by an elevation device with expected elevation data to determine whether the collected data falls within an acceptable range (e.g., within a threshold value of a historical value).

Fusion analysis may include analyzing publicly available position data or image data associated with a property (e.g., satellite data, street view data from a mapping platform, or other data depicting aspects of a property) with elevation and/or validation data collected by an elevation device and validation device (e.g., steps 215, 225, 236, 244, 257 of FIGS. 2A-2E, respectively). As an example, an image of a property in a repository may be used to estimate a first floor elevation. Embodiments may include analyzing images to identify ground outside building and to identify one or more architectural features (e.g., a door, window, roof, or other structures in a building). Dimensions of identified architectural features may be estimated using image data (e.g., by comparing image-dimensions to dimensions of known objects, by triangulating dimensions using multiple images, by using a range of standard or expected dimensions such as standard door sizes, standard door knob sizes, or other forms of image analysis). Ground floor elevation may be estimated based on dimensions of identified architectural features and distances between the features and the ground.

In some embodiments, validation data may be compared to expected validation data (e.g., satellite image may be analyzed to estimate GPS coordinates of building boundaries or corners and compared to measurements by the validation device; previously-reported position data may be compared to measured data).

Based on a result of the fusion analysis (e.g., steps 216, 226, 237, 245, 258 of FIGS. 2A-2E), the system may trigger a recalibration procedure of the elevation device or of the validation device (e.g., where differences between position data measured by the elevation device and validation device exceed a threshold; where a difference between an expected value and measured value exceeds a threshold). In some embodiments, based on a result of the fusion analysis, the system may update data stored in a repository based on measured elevation or validation data.

A cloud platform may implement risk models (consistent with the present disclosure) using hazard and vulnerability data (including first floor elevation data) to produce model output. Model output may include or be used to generate a risk score and/or provide a certification (e.g., an elevation certification for insurance purposes).

Embodiments may include updating risk models using elevation and/or validation data (e.g., training machine learning models).

Embodiments may include obtaining risk data associated with other hazards. For example, rather than collecting elevation data, methods may include measurements reflecting a vegetation density and follow validation methods consistent with the disclosed embodiments to assess fire risk. Embodiments may include collecting spectral measurements and/or distances between vegetation and structures, and these vegetation data may be validated using image data or spatial data gathered by a validation device or a combined vegetation data and validation data device.

In some embodiments, a data fusion system for processing elevation data from multiple sources may comprise: one or more memory units storing instructions; and one or more processors configured to execute the instructions to perform operations comprising: receiving ground location data collected associated with a boundary of a building, the ground location data comprising ground position data and ground elevation data; receiving building location data associated with a level of the building, the building location data comprising building position data and building elevation data; receiving image data associated with the ground location data and building location data; using a data fusion model to validate the building elevation data based on the image data, the ground location data, the building position data, and property data received from a remote repository; and using a machine learning model to determine a natural hazard risk score based on the validated building elevation data.

Embodiments may further comprise generating a rating (e.g., certificate).

In some embodiments, the elevation data may be based on pressure sensor data.

Embodiments may further comprise performing a remote calibration procedure on the elevation device based on the validation of the elevation data.

In some embodiments, the boundary may be a corner of the building.

Embodiments may further comprise training the machine learning model using a known marker (e.g., object in image; a map object).

Embodiments may further comprise updating one or more third party repositories (e.g., Google™).

Embodiments may further comprise using data collected by a validation or elevation device associated with a different property to validate elevation profile.

Embodiments may further comprise having elevation data based on lidar (e.g., knowing it is x-feet above the ground, wherein x is a value).

Embodiments may further comprise performing one or more mitigating actions, consistent with disclosed embodiments.

Embodiments may further comprise notifying one or more parties based on risk score.

Certain aspects of the present disclosure focus on communities and provide solutions using a distributed sensor network that includes a comprehensive flood vulnerability analysis and planning for counties and cities. Solutions include (but are not limited to) flood risk modeling, financial impact modeling, real estate economics analysis, insurance impact analysis, GIS visualizations, risk transfer/mitigation solutions, and risk monitoring/alert services. Such aspects of the present disclosure can be used for emergency planning, detecting or predicting highly local hazards (e.g., trees falling on building or power lines), predicting power outages, installing cameras to monitor animals or conduct general public safety surveillance, resilience planning (e.g., determining groundwater intrusion (salinity sensors underground—order of meters 2-3 meters), impact of sea level rise, pumping, seepage, or other determinations related to local hazards.), and real time environmental data collecting and processing.

Figure 3:
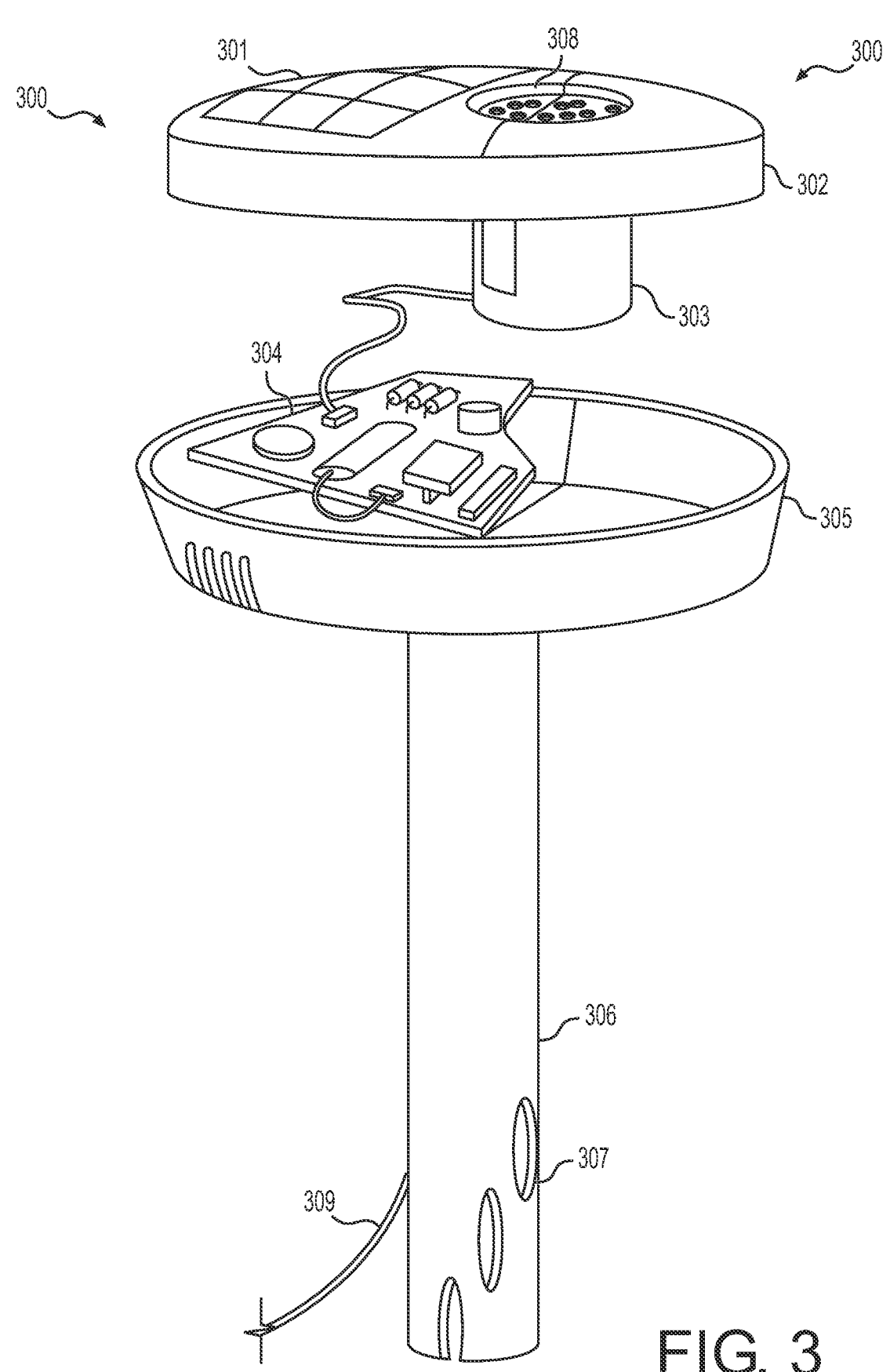
FIG. 3 illustrates an exemplary embodiment of a multi-sensor station, according to various embodiments.

FIG. 3 illustrates an exemplary multi-sensor station 300 (hereinafter "RESI" station 300), consistent with disclosed embodiments. For example, RESI station 300 may include solar panel 301, an aerodynamic enclosure top 302, a tipping bucket rain gauge 303, an electronics board 304, an aerodynamic enclosure bottom 305, a mounting post 306, a flood gauge (e.g., perforated) 307, a rain precipitation collector 308, a power cable 309 or other components consistent with disclosed embodiments. Electronics board 304 may include at least one of a battery, a temperature sensor, a humidity sensor, a pressure sensor, a light sensor or other sensors. RESI station 300 may include components for wireless communication (e.g., a GNSS antenna, a LoRA (long range wireless) module, a GSM transceiver, a 3G transceiver, a 4G transceiver, a Wi-Fi router, or other equipment for wireless communication). RESI station 300 may include components for wired communication (e.g., high speed internet cables, fiber optic cables, or other cables). Wired and wireless communication components may be located on electronics board 304, for example.

RESI stations that include multiple sensors may be distributed at various locations throughout a community. A network of stations may be distributed based on population and risk to the critical infrastructure (e.g., sparse at the county level but dense at a township level). A RESI station may be capable of flood detection sensors to assess and monitor the real time flood risk of the region. Based on an array of stations and models (e.g., risk models, catastrophe models, artificial intelligence/machine learning models), a comprehensive flood hazard map may be generated to aid planning at the county level. This may facilitate planning for changing climate or planning on short timescales. The resulting maps may be used for city/county level planning including (but not limited to) establishing building codes, hazard mitigation planning, and other financial planning.

Different mounting configurations are included. For example, aside from the free-standing pole mount shown in FIG. 3, a RESI station may be mounted to a building, to a utility pole, a utility wire, or other structures. The system may use cellular networks, LoRa (long range wireless), or LTE communication methods, or other wireless modalities.

The RESI stations may communicate directly or indirectly with a server or cloud platform (i.e., through nodes of a RESI network).

Embodiments may include detecting anomalies. For example, a triggering event (such as those discussed above) may be identified. Example embodiments may include at least one or more of receiving event data, determining risk, taking one or more mitigation actions (e.g., deploying a drone and/or satellite to collect additional data (e.g., sensor data, image data) and determining damage based on the drone and/or satellite data), and/or initiating an evacuation.

Mitigation actions may include one or more of turning on one or more sensors, altering a rate of data collection based on a triggering event, sending an instruction to a satellite and/or drone to perform a fly-over and collect and send data, deploying a drone and/or satellite, deploying personnel, adjusting a flow rate of a dam, and/or deploying an automated flood mitigation system including but not limited to flood gates or barriers, water outlet or release walls, or other infrastructure that controls water flow.

Embodiments may further comprise sending an alert (e.g., an evacuation alert), generating a visualization, generating a heatmap, updating one or more hydrological routing models, updating an urban planning design, determining a depth and slope in a 3D image and assessing a risk and damages based on the depth or slope.

In some embodiments, a community-based multi-sensor device for monitoring natural hazard risk may comprise a rain gauge, a temperature sensor, a pressure sensor, a humidity sensor, one or more memory units storing instructions, and one or more processors configured to execute the instructions to perform operations. For example, the operations may comprise collecting environmental data comprising temperature data, pressure data, humidity data and rainfall data, transmitting the environmental data to an event server, receiving an instruction from the event server based on the environmental data, changing a data collection setting based on the instruction, and transmitting updated environmental data based on the changed data collection setting.

FIG. 4 shows an exemplary method 400 for community-based multi-sensor fused data processing for determining natural hazard vulnerability. The method or a portion thereof may be performed by a server. For example, the server may be an event server including one or more processors and a memory storing instructions that, when executed by the one or more processors, causes the event server to perform the steps shown in FIG. 4.

At step 402, the event server may be configured to receive localized data from a distributed multi-sensor network. In some embodiments, the distributed multi-sensor network may include a plurality of sensor devices associated with a community. For example, the distributed multi-sensor network may include multiple sensors distributed at various locations throughout a community. In some embodiments, the distributed multi-sensor network may include sensors on the ground, mounted to a building, to a utility pole, a utility wire, and/or a combination thereof. In some embodiments, the distributed multi-sensor network may include airborne sensors, such as one or more drones. In some embodiments, the distributed multi-sensor network may include one or more satellites. In some embodiments, a sensor device of the plurality of sensor devices may comprise a rain gauge, temperature sensor, humidity sensor, pressure sensor, light sensor, LoRa sensor, seismic sensor, wind sensor, tide sensor, infrared sensor, soil moisture sensor, LiDAR sensor, or the like. A sensor device of the plurality of sensor devices may be configured to measure flood depth and/or extent, precipitation, temperature, humidity, pressure, elevation, light, soil moisture content, ground motion and vibrations, wind speed and/or direction, sea level changes, and the like. Additionally or alternatively, a sensor device of the plurality of sensor devices may be configured to use laser technology to map terrain and assess risk from landslides or other mass movements. Additionally or alternatively, a sensor device of the plurality of sensor devices may be configured to capture thermal images and provide information about the distribution and intensity of heat, which may be used in monitoring wildfires and the like. In some embodiments, one or more sensor devices of the distributed multi-sensor network may be configured to collect localized data and assess a risk associated with a particular natural hazard based on the collected localized data in real time. In some embodiments, one or more sensor devices of the distributed multi-sensor network may be configured to collect localized data and transmit the collected data and/or the assessed risk to the event server in real time. Data may be received before, during, and/or after a natural hazard event.

According to various embodiments, one or more sensor devices of the plurality of sensor devices may be included within one or more multi-sensor stations, such as RESI station 300 as shown in FIG. 3. For example, the distributed multi-sensor network may include a plurality of RESI stations, wherein each multi-sensor RESI station includes at least one of a solar panel, an aerodynamic enclosure top, a tipping bucket rain gauge, an electronics board, and/or other components as discussed with respect to FIG. 3. In some embodiments, the distributed multi-sensor network may be configured for wireless communication (e.g., GNSS antenna, LoRA module, GSM transceiver, 3G transceiver, 4G transceiver, Wi-Fi router, or other wireless communication configurations) and/or wired communication (e.g., high speed internet cables, fiber optic cables, or other cables).

At step 404, the event server may be configured to receive property data, community infrastructure data and environmental data from at least one external repository (e.g., external data sources 108 of FIG. 1, one or more repositories 240 of FIGS. 2A-2E). In some embodiments, the at least one external repository may be located on one or more external servers configured to communicate with the event server via a network or other connection. In some embodiments, the event server may be configured to receive property data, community infrastructure data and environmental data specific to a particular hazard (e.g., flood, fire, earthquake, or other disaster). Additionally or alternatively, the event server may be configured to receive property data, community infrastructure data and environmental data associated with the same community as the received localized data. Data may be received before, during, and/or after a natural hazard event.

Property, according to various disclosed embodiments, may refer to homes and/or small businesses that belong to one or more owners. Property data may include at least one of an indication of a building condition, a building material, a building age, a building height, or any other building engineering characteristics associated with a property. Additionally or alternatively, property data may include at least one of an indication of a land condition (e.g., soil type) and/or vegetation condition (e.g., coverage, type, presence of buffer areas or lack thereof, or other characteristics relating to vegetation) associated with a property. Additionally or alternatively, property data may include a location of the property, the topography (i.e., elevation and slope) of the property, climate (e.g., average temperature and precipitation patterns), and any historical hazard events that have impacted the property.

Community infrastructure data may include data associated with emergency response systems (e.g., fire departments, hospitals, police departments, or other crisis management systems), transportation systems (e.g., roads, bridges, or other mobility infrastructure), hazard mitigation measures (e.g., levees, flood walls, fire-resistant building materials, stormwater systems, pumping stations, drainage systems, sewer systems, or other mitigation systems), and the like. In some embodiments, community infrastructure data may include data such as a condition, location and/or status associated with different infrastructure in the community. For example, community infrastructure data may include an indication of a presence and effectiveness of an infrastructure system (e.g., drainage system, flood walls, or other support network systems), or lack thereof.

Environmental data may include at least one of precipitation data, moisture data, storm surge data, wind data, temperature data, pressure data, fire extent, vegetation data (e.g., types and density), GPS data and the like. Additionally or alternatively, environmental data may include climate data (e.g., historical data on temperature, rainfall, and other weather patterns, as well as projections for future climate conditions), topographical data (e.g., elevation, slope, and terrain of an area), soil data (e.g., type and stability of soil in an area), hydrological data (e.g., information on the flow and level of rivers, lakes, and other bodies of water), seismic data (e.g., information on the frequency and intensity of earthquakes in the area, as well as data on the underlying geology), coastal data (e.g., information on the coastal environment, including the shape and elevation of the coastline, the proximity of the area to the ocean), and the like. In some embodiments, environmental data may include one or more images. For example, environmental data may be collected by one or more image sensors of the distributed multi-sensor network. In some embodiments, environmental data may include time series data. In some embodiments, environmental data may be collected by one or more drones. In some embodiments, environmental data may be collected by one or more satellites, such as remote sensing satellites (e.g., optical and/or radar satellites). For example, one or more drones/satellites may be configured to collect environmental data over a region of an earth and store the collected data in a local or external repository. In some embodiments, the event server may be configured to retrieve the collected environmental data. In some embodiments, the one or more drones/satellites may be configured to transmit the collected data to the event server.

According to various embodiments, property data, community infrastructure data, and environmental data may include historical property data, historical community infrastructure data, and/or historical environmental data, respectively.

At step 406, the event server may be configured to generate combined data using data fusion. For example, the combined data may be generated based on the localized data from the distributed multi-sensor network and at least one of the property data, community infrastructure data or the environmental data. In some embodiments, combined data may include, for each building associated with each property of the community, a number of stories, a building foundation, a year of construction, first floor elevation (above ground), distance to nearest stream, a catchment area upstream of the property, and/or the like. In some embodiments, the combined data may include a hazard map. For example, the hazard map may be a map that identifies risk areas of a community for a particular hazard based on received localized data, property data, community infrastructure data, and/or environmental data. In some embodiments, each risk area may have an associated risk indicator (e.g., risk level or score) determined by the event server that indicates a level of risk associated with the risk area in response to a hazard event. According to some embodiments, the hazard map may be a flood risk map that identifies risk areas of a community related to a flood event. According to some embodiments, the hazard map may be a heat map that identifies risk areas of a community related to a fire event. According to some embodiments, the hazard map may be a hurricane risk map that identifies risk areas of a community related to a hurricane event. The hazard map may be any risk map that identifies risk areas of a community related to a particular hazard.

Data fusion may involve combining multiple data sources into a single, more informative representation by using methods such as integration, reconciliation, and decision making. Performing data fusion may improve the accuracy and completeness of information and may provide a more complete understanding of an event. According to the disclosed embodiments, data fusion may refer to the integration of multiple sources of data (e.g., localized data from the distributed multi-sensor network, property data, community infrastructure data, and/or environmental data) to create a more comprehensive understanding of the potential impact of a natural hazard, which may allow for improving the accuracy of hazard assessments and decision making related to risk management. For example, environmental data, such as data from satellite imagery can provide information about the location, size, and extent of a natural hazard, while localized, ground-based observations can provide detailed information about the local impact. By combining these sources of data, it becomes possible to create a more accurate and comprehensive picture of the hazard and its impact, which may help in making risk management decisions.

In some embodiments, data fusion may include pre-processing. Pre-processing may include reformatting the received data into a format that can be input into a machine learning model. In some embodiments, pre-processing may occur at the event server, the distributed multi-sensor network, one or more satellites, one or more drones and/or a combination thereof. For example, pre-processing may be performed prior to the event server, such as at the sensor level, such that in response to receiving a trigger to collect data, one or more sensors, one or more satellites and/or one or more drones may be configured to collect and format a particular set of data related to a specific hazard. Additionally or alternatively, pre-processing may be performed at the event server such that the event server may perform pre-processing in response to receiving collected data from the distributed multi-sensor network and the at least one external repository.

Data pre-processing may comprise reformatting the collected and/or received data (e.g., localized data, property data, community infrastructure data, and/or environmental data) by removing any errors, outliers, or inconsistencies that may negatively impact the performance of a machine learning model. In some embodiments, pre-processing may include cleaning the data to remove any missing, incorrect or inconsistent data values. In some embodiments, pre-processing may include normalizing the data to be on a consistent scale. In some embodiments, pre-processing may include transforming the data into a form more suitable for a machine learning model. For example, transforming the data may include creating new features, encoding categorical variables, or scaling the data. In some embodiments, pre-processing may include selecting a subset of available features in the data that are most relevant for the problem being solved. For example, the event server may be configured to determine what features from the received localized data, property data, community infrastructure data, and environmental data are relevant to a specific natural hazard for risk assessment. In the case of a flood natural hazard risk assessment, the event server may be configured to select features associated with assessing flood risk from the received data. On the other hand, for a fire natural hazard risk assessment, the event server may be configured to select features associated with assessing fire risk from the received data. According to various embodiments, the features related to specific natural hazards may be different from one another. For example, features associated with assessing flood risk may be different from features associated with assessing fire risk. In some embodiments, pre-processing may include dividing the data into separate training and testing sets, wherein the training set may be used to train a machine learning model and the testing set may be used to evaluate its performance. Performing data pre-processing may help to improve the accuracy and reliability in the machine learning process.

Data fusion methods to generate combined data may include decision level fusion, feature level fusion, decision-tree based fusion, and/or a combination thereof based on any specific requirements of a risk assessment as well as an availability and/or quality associated with data sources. Data fusion methods may help to address issues with data uncertainty and data heterogeneity and may improve data quality and the overall accuracy of natural hazard risk assessments.

Decision level fusion may include partitioning data for input into more than one machine learning model. For example, data partitioning may involve dividing data (e.g., pre-processed localized data, property data, community infrastructure data, and/or environmental data) into several subsets used to train separate machine learning models. Once each machine learning model is trained, each trained machine learning model may be used to make a prediction on the combined data and the predictions from each model may be combined to produce a final community risk score. Doing so may allow for creating a final prediction that may be more accurate and robust than any individual model and may help to reduce uncertainties associated with machine learning predictions.

Feature level fusion may include combining the features (i.e., variables, attributes, or other merging features) or characteristics of multiple data sources into a single, integrated representation. For example, feature level fusion may include feature extraction and feature combination. Feature extraction may involve extracting features from each source of data through techniques such as image processing, data reduction, and/or statistical analysis. Feature combination may involve combining features from each source of data (e.g., pre-processed localized data, property data, community infrastructure data, and/or environmental data) into a single, unified set (i.e., combined data) by concatenating, averaging, and/or the like to combine the features. By combining the features from multiple sources, feature-level fusion may help to create a more complete and accurate representation of an event and may improve the accuracy and reliability of machine learning predictions.

Decision-tree based fusion may comprise using decision trees to make decisions about which data (e.g., pre-processed localized data, property data, community infrastructure data, and/or environmental data) to use for a prediction. For example, decision-tree-based fusion may comprise feature extraction and decision tree training. Feature extraction may involve extracting features from each source of data through techniques such as image processing, data reduction, and/or statistical analysis. Decision tree training may include training a decision tree to decide which data (e.g., of the preprocessed localized data, property data, community infrastructure data, environmental data, and/or subsets thereof) to use as combined data. The decision tree may be trained using the extracted features and a set of labeled data that indicates the desired output for each example. The decision tree may take into account the strengths and limitations of each data source and may make decisions based on the most relevant and accurate information available.

At step 408, the event server may be configured to determine a community risk score for a natural hazard by implementing a machine learning model on the combined data. For example, the machine learning model may include a decision tree, random forest, support vector machine, neural network model, or the like. The choice of machine learning model may depend on the specific requirements of the risk assessment and the nature of the fused data. According to various embodiments, the model may be trained on the combined data. The trained model may be tested on a set of independent truth data to assess the accuracy and reliability of the model. For example, the trained model may be tested on a set of data separate from the combined data to simulate real-world conditions. By comparing the model's predictions on the independent data to actual outcomes, the model's performance can be evaluated using appropriate metrics such as accuracy, precision, recall, and F1-score. Based on a poor performance result for the independent data, adjustments may be made to improve the performance of the model. Based on the performance result for the independent data being greater than a predetermined level, the machine learning model may be deployed to determine a community risk score for the combined data. Model validation may help ensure that the final model is reliable and can be trusted to make accurate predictions about risks associated with a potential natural hazard.

In some embodiments, the community risk score may be calculated based on a combination of the likelihood of a hazard event occurring, the potential consequences of the hazard event, and the effectiveness of protection measures. In some embodiments, the community risk score may be output as a numerical value (e.g., value on a scale). In some embodiments, the community risk score may be presented on a hazard map with different areas color-coded or shaded to indicate different levels of risk. In some embodiments, the community risk score may be output as a level (e.g., low, medium, high, or other tier).

As an exemplary embodiment, combined data may include pre-processed environmental data, such as a flood hazard map, and property data, such as a number of stories, building foundation, year of construction, and the like associated with each building for each property of the community. The flood hazard map may give flood depths for each grid cell (e.g., 30×30 meter grid cell) and the machine learning model may be configured to determine a risk score for each grid cell by comparing flood depths between grid cells. For example, a first grid cell with a higher flood depth than a second grid cell next to the first grid cell (i.e., water from the first grid cell would flow into the second grid cell during a flood event) may be given a lower risk score than the second grid cell. Property data may be fed into the machine learning model, which may be configured to then compute a property risk score (e.g., on a scale of 1 to 10, 1=low risk; 10=high risk) for each property of each grid cell based on the determined risk scores for each grid cell to determine updated risk scores for each grid cell. Based on the computation, the machine learning model may be configured to determine the community risk score. For example, the machine learning model may be configured to compute an average of the updated grid cell risk scores to determine the community risk score. In some embodiments, each feature fed into the machine learning model may be weighted or scaled according to importance. For example, a higher weight for a feature may mean that it has a greater impact on the community risk score while a lower weight for a feature may mean that it has less of an impact.

In some embodiments, one or more processors may be configured to determine a depth and a slope based on an image and assess a damage risk based on the determined depth or slope, wherein the community risk score is based on the damage risk. For example, the image may be an image of a terrain generated by a drone/satellite configured to collect data over a region of the earth based on a flyover path. In some embodiments, the image may be three-dimensional. The event server may receive and process the image to extract relevant information. For example, processing the image may include image segmentation, feature extraction, and/or terrain modeling to create a digital elevation model (DEM) that accurately reflects the depth and slope of the terrain. After processing the image, the event server may be configured to perform feature extraction to extract relevant features from the processed image. For example, extracted features may include the depth and slope of the terrain, as well as the presence of vegetation, infrastructure, and proximity to water bodies. In some embodiments, the image may be stored in one or more repositories (e.g., environmental data repository, property data repository). In some embodiments, the image may be generated by the event server. In some embodiments, the image may be generated by one or more sensors of the distributed multi-sensor network.

At step 410, the event server may be configured to perform a mitigating action based on the community risk score. For example, based on the determined community risk score, the event server may be configured to first assess a severity and potential impact of the natural hazard. Based on the assessment, the event server may be configured to perform one or more mitigating actions. According to some embodiments, the event server may be configured to perform more than one mitigating action. In some embodiments, a mitigating action may be performed automatically based on the community risk score, severity assessment, potential impact, and/or a combination thereof. In some embodiments, the event server may refer to a lookup table (e.g., retrieved from a local repository or external repository) to determine which mitigating action to perform based on the community risk score, wherein the lookup table may map each risk score to one or more preset mitigating actions. In some embodiments, the event server may dynamically determine which mitigating action to perform based on the determined community risk score and assessment of the severity and potential impact of the natural hazard. For example, the event server may input historical and real-time hazard event data into a machine learning model to determine one or more most optimal mitigating actions to perform to minimize impact of the natural hazard.

In some embodiments, the mitigating action may comprise turning on a sensor device of the plurality of sensor devices. For example, based on the community risk score being greater than or equal to a predetermined threshold, the event server may be configured to transmit an instruction to turn on one or more sensor devices. In some embodiments, turning on a sensor device may be performed manually in-person. In some embodiments, turning on a sensor device may be performed remotely and/or automatically triggered. For example the event server may establish a secure and reliable connection with one or more sensors of the distributed multi-sensor network through a local network or remote connection. The event server may be configured to access a sensor's configuration interface and may enable the power via power control within the configuration interface (e.g., by entering a command, clicking a button, or any other method to adjust a configuration). In some embodiments, accessing the sensor's configuration interface may require providing proper authentication credentials.

In some embodiments, the mitigating action may comprise altering a rate of data collection associated with one or more of the plurality of sensor devices. For example, based on the community risk score being greater than or equal to a predetermined threshold, the event server may be configured to transmit an instruction to increase a rate of data collection associated with one or more of the plurality of sensor devices. In some embodiments, altering a rate of data collection may be performed manually in-person. In some embodiments altering a rate of data collection may be performed remotely and/or automatically triggered. For example the event server may establish a secure and reliable connection with one or more sensors of the distributed multi-sensor network through a local network or remote connection. The event server may be configured to access a sensor's configuration interface and may change a data collection rate (e.g., sampling rate, data collection interval, or other data acquisition rate) within the configuration interface (e.g., by adjusting a numerical value, selecting a new option, or any other method to adjust a configuration). In some embodiments, accessing the sensor's configuration interface may require providing proper authentication credentials.

In some embodiments, the mitigating action may comprise deploying a satellite and causing the satellite to collect and transmit data. For example, in response to the community risk score being greater than or equal to a predetermined threshold, the event server may generate an updated flyover path and transmit instructions including the updated flyover path to a satellite that cause the satellite to collect data over a region of the earth according to the updated flyover path. In some embodiments, generating an updated flyover path may include determining a desired new path by considering factors such as the community for which data is to be collected, the location of other satellites or objects in space, and any constraints on the satellite's flyover path. Additionally or alternatively, generating an updated flyover path may include calculating and implementing a velocity change, wherein calculating the velocity change may include determining a direction and magnitude of velocity change required to cause the desired change in the satellite's trajectory. Implementing the velocity change may include adjusting the calculated velocity change via the satellite's onboard propulsion system. In some embodiments, steps for generating an updated flyover path may be performed by the event server, the satellite, and/or a combination thereof.

In some embodiments, the mitigating action may comprise deploying a drone to collect data associated with the community. For example, in response to the community risk score being greater than or equal to a predetermined threshold, the event server may generate a flight path and transmit instructions including the flight path to a drone that cause the drone to collect data over an area according to the flight path. In some embodiments, generating a flight path may include determining the type of data to be collected (e.g., for what type of hazard, what type of data, such as images, videos, mapping data, or other category of data) and considering factors such as the size and shape of the area, an altitude at which the drone will fly, and an optimal flight speed. The generated flight path may be transmitted to the drone which causes the drone to collect data according to the generated flight path using onboard sensors, cameras, and the like in real-time. In some embodiments, the collected data may be stored in an internal repository of the drone. In some embodiments, the collected data may be transmitted to the event server via a network connection.

In some embodiments, the mitigating action may comprise deploying personnel. For example, deploying personnel may include sending an alert to one or more emergency responders (e.g., fire stations, police stations, paramedics, or other emergency personnel) in response to the community risk score for a hazard event being greater than or equal to a predetermined threshold. In some embodiments, the event server may send the alert to one or more emergency responders within a predetermined range of a particular area within the community. For example, in response to a risk score for a particular area of the community being greater than a predetermined threshold, the event server may send the alert to one or more emergency responders within a predetermined range (e.g., within 1-10 miles) of the particular area. In some embodiments, the event server may generate and send an alert to one or more hazard mitigation specialists trained to assess and mitigate risks associated with specific hazards. In some embodiments, the event server may generate and send an alert to one or more emergency management personnel responsible for managing emergency response efforts (e.g., evacuation planning, resource allocation, communication with the public, or other crisis management personnel). In some embodiments, the event server may generate and send an alert to personnel trained to assess the impact of a hazard on the environment and provide information that can inform the response effort. In some embodiments, the event server may generate and send an alert to construction and repair personnel, such as engineers capable of repairing and rebuilding infrastructure damaged by a hazard. In some embodiments, the event server may generate and send an alert to military personnel to assist with emergency response efforts, particularly in the case of large-scale disasters. In some embodiments, sending an alert to deploy personnel may be automatically triggered based on the community risk score.

In some embodiments, the mitigating action may comprise initiating an evacuation. For example, the community risk score being greater than a predetermined threshold may indicate that the likelihood of hazard risk is high and potential impact on people and property is severe. In some embodiments, initiating an evacuation may include automatically connecting with relevant emergency services to activate an emergency response team. Additionally or alternatively, the event server may automatically establish communication with local authorities. In some embodiments, initiating an evacuation may comprise sending an alert. For example, the event server may notify the public of potential danger using all available means of communication (e.g., sirens, radio, TV broadcasts, text messages, social media) and may provide instructions for evacuation. In some embodiments, initiating an evacuation may include establishing and marking the safest and quickest evacuation routes by considering traffic flow, road conditions, and other potential obstacles. In some embodiments, initiating an evacuation may be automatically triggered based on the community risk score.

In some embodiments, the mitigating action may comprise adjusting a flow rate of a dam. For example, based on the community risk score being greater than or equal to a predetermined threshold, the event server may be configured to transmit an instruction to adjust a flow rate of a dam. For example, adjusting a flow rate of a dam may include opening or closing spillway gates. Based on predicting that a water level may be high at a particular reservoir, the spillway gates may be opened to prepare for releasing excess water. Additionally or alternatively, adjusting a flow rate of a dam may include adjusting a gatehouse for a dam. Additionally or alternatively, for hydroelectric power plants, the flow rate may be adjusted by controlling the amount of water released from the turbine. Adjusting a flow rate of a dam may be performed through remote control or may be performed manually in-person. In some embodiments, a flow rate of a dam may automatically be adjusted in response to the community risk score being greater than or equal to a predetermined threshold.

In some embodiments, the mitigating action may comprise deploying an automated flood mitigation system. Automated flood mitigation systems may include systems using sensors, control systems, and other components to automatically respond to rising water levels and prevent or mitigate flooding. For example, automated flood mitigation systems may comprise flood gates, flood barriers, pump stations, water outlets, and/or release walls.

In some embodiments, deploying an automated flood mitigation system may include choosing an appropriate automated flood mitigation system based on the specific risks and vulnerabilities identified in a risk assessment. Based on the chosen automated flood mitigation system, the event server may select the appropriate locations for sensors, pumps, and other components, and the design of control systems and networks. The automated flood mitigation system components may be installed and integrated with other flood management measures, such as early warning systems, decision support systems, intelligent transportation systems, and/or evacuation plans to provide a comprehensive approach to flood risk reduction. For example, early warning systems may be configured to monitor water levels using sensors and may provide real-time alerts to relevant authorities and communities when flooding is imminent. Decision support systems may be configured to use data from sensors and other sources to provide real-time information to decision-makers such that they may respond to flood events more effectively. Intelligent transportation systems may be configured to use real-time data from sensors and other sources to dynamically redirect traffic and prevent road closures due to flooding. Evacuation plans may include initiating an evacuation, as previously discussed. In some embodiments, deploying an automated flood mitigation system may be automatically triggered based on the community risk score In some embodiments, method 400 may further comprise generating a visualization. For example, the visualization may comprise a map, chart, graph, dashboard, 3D model, infographic, or any other visualization capable of communicating risk of hazard. Maps may include static maps, interactive maps, animations, or any other map to show the extent and severity of a hazard, as well as the areas that are most vulnerable to its impacts. Charts and graphs may be generated to visualize trends in the hazard over time, such as changes in water levels, wind speeds, and the like. Dashboards may provide real-time information on the status of a hazard and its potential impacts using data from sensors and other sources. 3D models may provide a more immersive visualization of the hazard and its potential impacts, allowing stakeholders to see the risks and vulnerabilities from different perspectives. Infographics may provide clear and concise information on the hazard and its potential impacts by using a combination of visual elements and text. The visualization may be generated according to any method known in the art. In some embodiments, generating a visualization may be performed by the event server. In some embodiments, generating a visualization may be performed by a device associated with a management entity.

In some embodiments, method 400 may further comprise generating a heatmap. A heatmap may be a visual representation of data using color to show the intensity of a particular value at a specific location and may be generated according to any method known in the art. In some embodiments, generating a heatmap may be performed by the event server. In some embodiments, updating one or more hydrological routing models may be performed by a device associated with a management entity.

In some embodiments, method 400 may further comprise updating one or more hydrological routing models. For example, updated data on hydrological conditions such as precipitation, stream flow, and other relevant variables, may be collected and each existing hydrological routing model may be evaluated by comparing the model results with the collected data. Based on the results of the evaluation, parameters of the model may be adjusted, such as by modifying equations or adding new variables. The model may be continuously tested, validated and refined until the determined accuracy of the model is above a predetermined threshold. In some embodiments, updating one or more hydrological routing models may be performed prior to generating combined data. In some embodiments, updating one or more hydrological routing models may be performed prior to determining a community risk score. In some embodiments, updating one or more hydrological routing models may be performed by the event server. In some embodiments, updating one or more hydrological routing models may be performed by a device associated with a management entity.

In some embodiments, method 400 may further comprise updating one or more digital urban planning maps. For example, updated physical and demographic characteristics of an area such as land use, building structures, and population data, may be collected to evaluate the performance of an existing map via comparison. Based on the results of the evaluation, changes may be made to the map, such as adding new features, modifying existing features, or removing outdated information. The updated map may by further compared with independent data sources, such as aerial imagery or field surveys to ensure that the map is accurate and up to date. The map may be continuously validated and refined as necessary (e.g., annually, as new data becomes available, or other period of time).

In some embodiments, method 400 may further comprise adjusting a setting of one or more of the plurality of sensors based on the natural hazard risk score. For example, in response to the community risk score being greater than or equal to a predetermined threshold, the event server may be configured to transmit an instruction to adjust a setting of one or more of the plurality of sensors. In some embodiments, adjusting a setting may be performed manually. In some embodiments adjusting a setting may be performed remotely. For example the event server may establish a secure and reliable connection with one or more sensors of the distributed multi-sensor network through a local network or remote connection. The event server may be configured to access a sensor's configuration interface and may locate a specific setting to adjust. The setting may be adjusted by changing the value of the setting to a desired value, selecting a new option from a drop-down menu, toggling a switch, or any other method to adjust the configuration. In some embodiments, accessing the sensor's configuration interface may require providing proper authentication credentials.

Certain aspects of the present disclosure may be related to an ecosystem of at-home flood sensors and county-level RESI stations. A system may collect and provide data access at different levels for different user groups. For example, county-level data may be anonymized, and a homeowner may be able to view s neighbor's data while still having access to aggregated information based on the neighbor's data. Embodiments include generating risk scores at a zip code, or by a zone. These may be decision tools for building codes or for updating publicly available data (e.g., updating maps).

With the combination of the smart home sensors and RESI stations, disclosed techniques may include setting up a flood risk ecosystem that will help in flood risk communication for different stakeholders.

Figure 5:
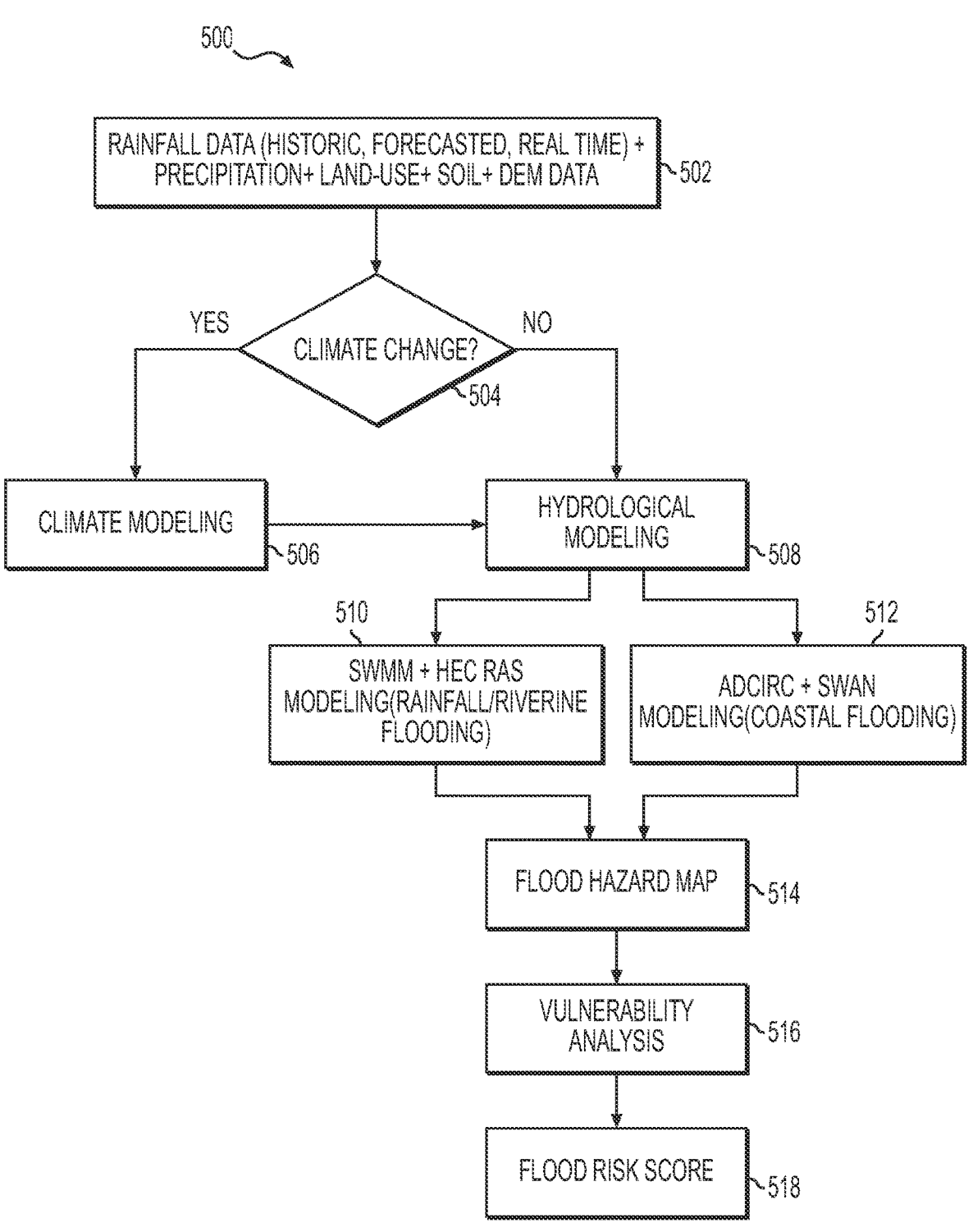
FIG. 5 is a flow diagram illustrating an exemplary embodiment for determining flood risk and performing mitigating actions, according to some embodiments.

FIG. 5 is a flow diagram of a method 500 for assessing flood risk for an area, according to some embodiments. The method or a portion thereof may be performed by a server. For example, the server may be an event server including one or more processors and a memory storing instructions that, when executed by the one or more processors, causes the event server to perform the steps shown in FIG. 5. Method 500 may be an exemplary embodiment of method 400 specific to determining flood risk.

At step 502, the event server may be configured to receive rainfall data (e.g., historic rainfall data, forecasted rainfall data and/or real-time rainfall data), precipitation data, land-use data, soil data, demographics data. For other hazard risk scenarios (e.g., fire, earthquake, or other potential danger situation), the data received at step 502 may be specific to the particular hazard. In some embodiments, the event server may be configured to receive data associated with a specific area (e.g., community). Data may be received before, during, and/or after a natural hazard event.

At step 504, based on the received data, the event server may be configured to determine whether to consider climate modeling (YES) or not consider climate modeling (NO). For example, based on determining that there is sufficient data that validates a change in a frequency and intensity of recent natural hazard events, the process may proceed to step 506. On the other hand, if the received data does not show significant changes in recent natural hazards, the process may proceed to step 508.

At step 506, the event server may be configured to perform climate modeling. Climate modeling may be used to simulate and predict changes in the Earth's climate system based on current and past conditions. For example, climate modeling may provide information on precipitation patterns, sea-level rise, and other factors that may contribute to increased flood risk. In the case of other hazard risk scenarios (e.g., fire, earthquake, or other potential danger situation), climate modeling may provide information on factors that may contribute to increase risk for the particular hazard. Climate modeling may output an initial risk score for the area that may be combined with the outputs of other risk models, as discussed below, to determine a final risk score.

At step 508, the event server may be configured to perform hydrological modeling. Hydrological modeling may be used to simulate the flow of water through a catchment area, from precipitation to runoff and river discharge. For example, hydrological modeling may provide information on the potential for runoff and flooding in a specific area based on factors such as precipitation, topography, soil moisture, and/or land use. The results (e.g., risk score) of hydrological modeling may be combined with the results of climate modeling and other models to estimate the likelihood of future flooding. In the case of other hazard risk scenarios, hydrological modeling may be replaced with a model specific to the particular hazard.

At step 510, the event server may be configured to perform Storm Water Management Modeling (SWMM) and Hydrologic Engineering Centers River Analysis System (HEC-RAS) modeling to simulate the behavior of water in urban and rural environments, respectively. These models can be used to determine a flood risk score by simulating various flood scenarios and evaluating their impact on the area of interest. The flood risk score may be a measure of the likelihood and potential consequences of flooding in a specific location based on factors such as topography, land use, and infrastructure. The results (e.g., risk score) of these models may be combined with the results of other models to estimate the likelihood of future flooding. In the case of other hazard risk scenarios, these models may be replaced with models specific to the particular hazard.

At step 512, the event server may be configured to perform Advanced Circulation Modeling (ADCIRC) and Simulating Waves Nearshore (SWAN) modeling to simulate ocean and coastal circulation and wave conditions, respectively. These models may be used to determine a flood risk score by simulating different storm and wave scenarios and evaluating their impact on coastal areas. The flood risk score may be a measure of the likelihood and potential consequences of coastal flooding in a specific location based on factors such as shoreline bathymetry, wave conditions, and coastal elevation. The results (e.g., risk score) of these models can be combined with the results of other models to estimate the likelihood of future flooding. In the case of other hazard risk scenarios, these models may be replaced with models specific to the particular hazard. In some embodiments, step 512 may be omitted if the area for which the flood risk score is being determined is not coastal.

At step 514, the event server may be configured to generate a flood hazard map based on the results of climate modeling, hydrological modeling, SWMM+HEC-RAS modeling, and/or ADCIRC+SWAN modeling. The generated flood hazard map may show the extent and depth of flooding for different flood scenarios.

At step 516, the event server may be configured to analyze the generated flood hazard map for vulnerability. Vulnerability analysis may include identifying critical infrastructure and assets (e.g., homes, businesses, roads, or other infrastructure) that are located in areas at risk of flooding. Additionally or alternatively, vulnerability analysis may include evaluating flood depths and extents for each scenario simulated in the models to determine the potential impact of flooding on the area. Additionally or alternatively, vulnerability analysis may include evaluating existing or planned flood protection measures (e.g., levees, pumps, sea walls, or other flood mitigation systems) to determine their ability to reduce the risk of flooding.

At step 518, the event server may be configured to output one or more flood risk scores based on the vulnerability analysis. For example, flood risk scores may be calculated based on a combination of the likelihood of flooding, the potential consequences of flooding, and the effectiveness of flood protection measures. In some embodiments, the one or more flood risk scores may be output as numerical values (e.g., values on a scale). In some embodiments, the one or more flood risk scores may be presented on the flood hazard map with different areas color-coded or shaded to indicate different levels of flood risk. In some embodiments, the one or more flood risk scores may be output as a level (e.g., low, medium, high, or other tier).

Figure 6:
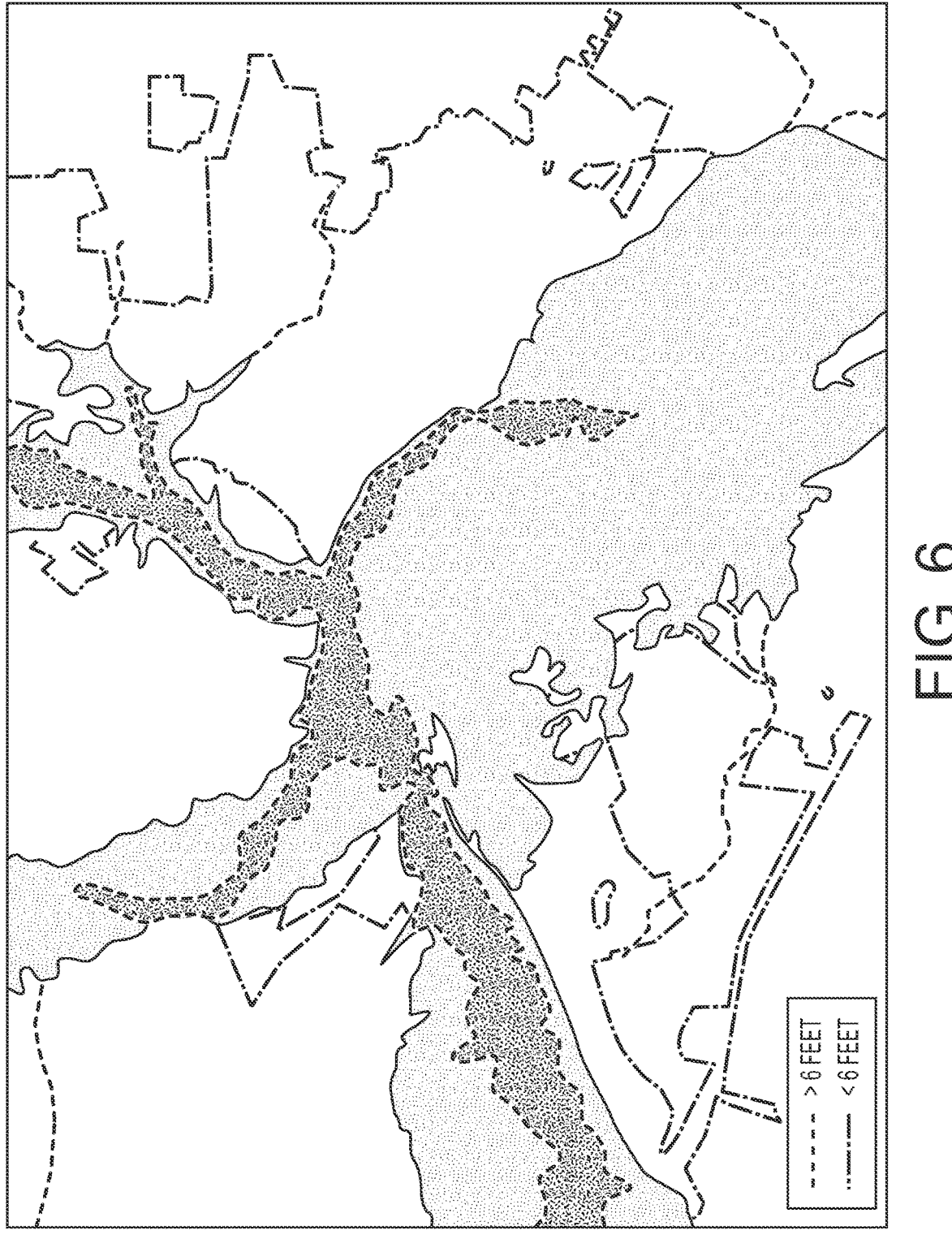
FIG. 6 illustrates an exemplary flood hazard map and performing mitigating actions, according to some embodiments.

FIG. 6 illustrates an exemplary flood hazard map, consistent with disclosed embodiments. The flood hazard map shown is a simplified example of flood hazard map generated as a result of a method, such as method 400 discussed in FIG. 4. The flood hazard map provides a visual representation of potential flood risks in the area shown and also provides information about the extent and depth of flooding for a 100-year flood. For example, areas depicted by dashed ( - - - - - ) lines are predicted to have flooding greater than 6 feet while areas depicted by dotted-dashed (• - - - •- - - •) lines are predicted to have flooding less than 6 feet. Such information may be used by flood management, emergency planning, and/or risk assessment entities to make informed decisions about risk management and mitigation strategies.

Certain aspects of the present disclosure include systems and methods for data fusion using remote sensing data and data gathered according to the other disclosed concepts (e.g., a home-based sensor, a RESI station).

Remote sensing satellites, such as radar satellites, gather ground data to monitor and/or predict flooding, fires, and other natural events in real time. Most satellites collect data continuously over a large area as they quickly circle the globe and can provide snapshots of particular areas passed during flyovers (e.g., every hour, every 15 minutes).

Traditional approaches, however, suffer from challenges. For example, satellite data are prone to inaccuracies, spatial data gaps (e.g., due to cloud cover), and temporal data gaps due to time lags between flyover events. Satellite data may be unavailable during critical times, such as at the time of the peak flood, because a moving satellite may not be positioned to gather data during those times. In addition, satellites gather data using electromagnetic wavelengths (e.g., radar) to sense parameters such as temperature, moisture, or other environmental variables, and these data need to be calibrated with on-the-ground measurements.

Embodiments address the foregoing challenges by augmenting and/or calibrating satellite data with on-the-ground sensor data in real time. This may allow measurements of ephemeral events (e.g., assessment of flood extent or other variable) in real time where a satellite misses it (e.g., due to gaps in satellite time series or due to cloud cover). Ground data can be used to calibrate remotely-sensed data. Further, by combining localized, sparse ground data with satellite data, risk models can be extended to a larger area than those based on ground data alone.

On-the-ground community-based and property-based devices according to the concepts herein may be used to gather data on flood depth, extent, precipitation, temperature, radiometer (light spectrum), or other variables.

Satellite data may include precipitation, temperature, flood depth, extent, fire extent, vegetation cover, moisture, images, and other data.

Embodiments may include creating time series data over a region to fill in gaps in satellite data using data from on-the-ground sensors.

Embodiments may include fusion analysis to generate assimilated data products, including interpolation techniques, such as additional spatial data (spatially interpolate) and additional temporal data (between satellite pass overs), machine learning, such as testing data samples (those dots—set some as targets some as sensors) training sample (every grid where there is no data), and/or spatial-temporal analysis. Using these analyses, the system may use the resulting data product to identify hot spots, assist with forecasting and resilience planning, trigger notifications, and trigger mitigating actions (e.g., as disclosed herein).

In some embodiments, a locally-detected flood or fire event (e.g., by a RESI station) triggers a call to perform a satellite fly-over to gather additional data. Additionally or alternatively, a fire or flood detected based on satellite data may trigger changes in data collection on the ground (e.g., at a RESI station).

FIG. 7 shows an exemplary method 700 for processing data from satellites and distributed sensor networks. The method or a portion thereof may be performed by a data fusion system. For example, the data fusion system may include one or more processors and a memory storing instructions that, when executed by the one or more processors, causes the data fusion system to perform the steps shown in FIG. 7.

At step 702, the data fusion system may be configured to receive natural hazard data from a distributed sensor network, the natural hazard data being associated with a region of the earth. For example, the natural hazard data may include real-time data collected by one or more multi-sensor devices of the distributed sensor network (e.g., distributed multi-sensor network of FIG. 4). In some embodiments, natural hazard data may include historical data collected by the distributed sensor network. In some embodiments, natural hazard data may be obtained by weather stations, seismographic networks, and/or remote sensing platforms. In some embodiments, natural hazard data may be obtained by one or more satellites. In some embodiments, natural hazard data may be obtained by one or more drones. In some embodiments, natural hazard data may include at least one of elevation data, precipitation data, moisture data, storm surge data, wind data, temperature data, pressure data, and/or GPS data. In some embodiments, natural hazard data may include, with respect to FIG. 4, the localized data, property data, community infrastructure data, environmental data, and/or a combination thereof. In some embodiments, natural hazard data may include, with respect to FIG. 4, the combined data generated using data fusion. In some embodiments, natural hazard data may include, with respect to FIG. 4, the community risk score for a natural hazard determined by implementing a machine learning method on the combined data. In some embodiments, the received natural hazard data may be associated with a specific type of hazard (e.g., flood, fire, earthquake, or other danger).

At step 704, the data fusion system may be configured to identify a hazard event based on the natural hazard data. In some embodiments, the hazard event may be a hazard event predicted to occur in the future. In some embodiments, the hazard event may be an ongoing event. In some embodiments, the data fusion system may be configured to perform data analysis to identify patterns, trends and/or anomalies that may indicate the presence of a hazard event. For example, data analysis may include time series analysis, cluster analysis, anomaly detection, geospatial analysis, and/or machine learning algorithms. In some embodiments, identifying a hazard event may include implementing a machine learning algorithm to automatically detect the presence of a hazard event based on the data analysis results.

Time series analysis may include analyzing the behavior of a variable over time to identify patterns, trends, and/or irregular fluctuations in the natural hazard data. Time series data may include a sequence of measurements of a variable taken at regular intervals over time. Time series analysis may be used to detect changes in the rate of a hazard event or to identify correlations between different variables that may be indicative of an ongoing or impending hazard event. In some embodiments, time series analysis may include transforming the natural hazard data into a compatible format and removing any outliers. Additionally or alternatively, time series analysis may include extracting relevant attributes of natural hazard data that will be used in the time series analysis. Additionally or alternatively, time series analysis may include performing techniques such as moving average, exponential smoothing, or seasonal decomposition of time series (STL) to break down the time series data into its constituent parts (e.g., trend, seasonal, and residual components). Additionally or alternatively, time series analysis may include analyzing each component. For example, analyzing the trend component may include identifying patterns (e.g., upward or downward trends) and assessing the stability of the trend over time. Analyzing the seasonal component may include identifying repeating patterns (e.g., daily, weekly, yearly cycles). Analyzing the residual component may include identifying irregular fluctuations in the data that cannot be explained by the trend or seasonality. The results of the time series analysis may be used to identify ongoing events or to make predictions about future natural hazard events, based on the patterns and relationships learned from the natural hazard data.

Cluster analysis may include grouping similar data points together based on their attributes and identifying patterns and relationships in the data. Grouping similar data points into clusters may be helpful in identifying areas that may be at higher risk for certain types of natural hazards. In some embodiments, cluster analysis may include organizing the received natural hazard data into a suitable format for cluster analysis and removing any outliers. Additionally or alternatively, cluster analysis may include feature extraction to select relevant attributes of the natural hazard data that will be used in the cluster analysis. Additionally or alternatively, cluster analysis may include selecting a method for measuring a similarity between data points (e.g., Euclidean distance, Manhattan distance, cosine similarity, or other method to calculate a similarity between data points) and selecting a clustering algorithm to use for the analysis (e.g., K-means, hierarchical clustering, DB SCAN, or other grouping technique). The selected clustering algorithm may be used to group the natural hazard data into clusters based on the similarity between data points determined by the selected method for measuring similarity between data points. The formed clusters may be analyzed to identify patterns, trends, and relationships in the natural hazard data.

Anomaly detection may include identifying data points that are significantly different from normal data points which may indicate the presence of a hazard event. In some embodiments, anomaly detection may include organizing the received natural hazard data into a compatible format and removing any outliers. Additionally or alternatively, anomaly detection may include selecting relevant attributes of the natural hazard data that will be used in anomaly detection. In some embodiments, anomaly detection may include training a statistical model (e.g., Gaussian distribution model, autoencoder model, or other statistical model) on the natural hazard data to learn the normal patterns and relationships in the data. The performance of the trained model may be evaluated by comparing the results to known patterns or relationships in the natural hazard data. Once the performance of the trained model indicates accuracy above a predetermined threshold, the trained model may be used to identify data points in the natural hazard data that deviate significantly from the normal patterns or relationships learned by the model. The identified data points may be further analyzed to determine if they indicate a natural hazard event or if they indicate an error or problem in the natural hazard data.

Geospatial analysis may include using geographic information systems (GIS) and spatial analysis techniques to analyze natural hazard data in a geographic context and to identify patterns, trends, and/or anomalies in the natural hazard data that may indicate the presence of a hazard event. In some embodiments, geospatial analysis may include organizing the received natural hazard data into a compatible format and removing any outliers. Additionally or alternatively, a geographic location may be assigned to the natural hazard data (e.g., latitude and longitude) in order to create a geospatial dataset. In some embodiments, a visual representation (e.g., map) of the natural hazard data may be created in order to visualize the spatial patterns and relationships in the data. Additionally or alternatively, the natural hazard data may be aggregated into a spatial unit (e.g., grid cell, administrative boundary) in order to summarize the data and identify patterns and relationships at a high level. The aggregated data may be analyzed using spatial analysis techniques (e.g., spatial autocorrelation, hot spot analysis, or other spatial analysis) to identify areas with a higher or lower frequency of natural hazard events. Based on the analysis, a spatial model (e.g., spatial regression model, spatial cluster model, or other spatial model) representing the patterns and relationships in the natural hazard data may be generated.

Machine learning may include using algorithms (e.g., decision trees, random forests, neural networks, support vector machines, or other machine learning algorithm) to analyze natural hazard data and identify patterns, trends, and/or anomalies that may indicate the presence of a hazard event. For example, machine learning to identify a hazard event may include transforming the natural hazard data into a compatible format and removing any outliers. In some embodiments, machine learning may include feature engineering (i.e., selecting relevant variables or features in the natural hazard data that are likely to be predictive of hazard events). In some embodiments, an appropriate machine learning algorithm may be selected and trained on a subset of the natural hazard data in order to learn the relationships between the features and the presence of a hazard event. The performance of the machine learning model may be evaluated and, in response to a positive evaluation result, the model may be deployed to make predictions or decisions related to the presence of a hazard event.

At step 706, the data fusion system may be configured to cause a satellite to alter a flyover path and collect data over the region of the earth. For example, in response to identifying a hazard event, the data fusion system may generate an updated flyover path and transmit instructions including the updated flyover path to a satellite that cause the satellite to collect data over the region of the earth according to the updated flyover path. In some embodiments, generating an updated flyover path may include determining a desired new path by considering factors such as the region for which data is to be collected, the location of other satellites or objects in space, and any constraints on the satellite's flyover path. Additionally or alternatively, generating an updated flyover path may include calculating and implementing a velocity change, wherein calculating the velocity change may include determining a direction and magnitude of velocity change required to cause the desired change in the satellite's trajectory. Implementing the velocity change may include adjusting the calculated velocity change via the satellite's onboard propulsion system. In some embodiments, steps for generating an updated flyover path may be performed by the data fusion system, the satellite, and/or a combination thereof.

At step 708, the data fusion system may be configured to receive environmental data collected by the satellite based on the altered flyover path. In some embodiments, environmental data may comprise a time series. For example, the time series may be gathered in flyovers by one or more data collection satellites wherein the one or more data collection satellites comprises the satellite. Satellites may be equipped with sensors to collect data over time, providing a time series of observations that can be used to monitor and analyze changes in the environment. For example, satellites may collect time series data on land surface temperature, vegetation health, ocean surface temperature, and the like, which can be used to track changes in these variables over time, as previously discussed. In some embodiments, the environmental data may include at least one of precipitation data, temperature data, flood depth data, extent data, fire extent data, vegetation cover data, moisture data, or image data.

At step 710, the data fusion system may be configured to perform a fusion analysis to generate a combined data set based on the natural hazard data and the environmental data. Fusion analysis may comprise combining multiple sources of data to create a more comprehensive and accurate understanding of an event.

In some embodiments, the fusion analysis may include implementing a machine learning model to interpolate the time series. The machine learning model may comprise a neural network (e.g., Convolutional Neural Network (CNN), Recurrent Neural Network (RNN), such as Long Short-Term Memory (LSTM), or other neural network), linear regression model, AutoRegressive Integrated Moving Average (ARIMA) model, Seasonal AutoRegressive Integrated Moving Average (SARIMA) model, or the like. In some embodiments, the machine learning model may interpolate the time series by predicting and filling in missing values in the data and/or combining data from different sources to create a more accurate and complete time series. For example, an LSTM model may be trained on historical natural hazard data such that it may be used to predict the values of natural hazard variables at future time points. The LSTM model may interpolate the values of natural hazard variables at missing time points by taking as input the values of sampled time points and using its learned relationships to generate estimates of the values at unsampled time points.

In some embodiments, fusion analysis may include spatial interpolation using spatial data and temporal data. For example, a spatial interpolation algorithm (e.g., kriging, inverse distance weighting (IDW), or other spatial interpolation technique) may be used to estimate values of natural hazard variables and environmental variables at unsampled locations based on values at sampled locations. Temporal interpolation methods (e.g., linear interpolation or spline interpolation) may be used to estimate values at unsampled time points based on values at sampled time points.

In some embodiments, the data fusion system may be further configured to calibrate the environmental data using the natural hazard data, and generate the combined data set based on the calibrated environmental data. Environmental data collected by the satellite may be subject to various sources of error (e.g., atmospheric interference, instrument drift, calibration errors), and ground sensor data (e.g., natural hazard data) can provide a reference for correcting these errors to improve the accuracy of environmental data. For example, the natural hazard data used to calibrate the environmental data may be collected at the same time as the environmental data and may cover the same region as the environmental data. In some embodiments, both sources of data may be transformed into a compatible format and compared over the same region and time period to identify any differences. Calibration may include adjusting the environmental data so that it is consistent with the natural hazard data. For example, calibration may include using statistical and mathematical methods (e.g., regression analysis, kriging, Bayesian networks, neural networks, Kalman filtering, or other algorithm) to adjust the environmental data based on the identified differences or applying a correction factor based on the natural hazard data. In some embodiments, the accuracy of the calibrated environmental data may be verified by comparing it with independent truth data, or by evaluating the results of the calibration against physical models or other reference data.

In some embodiments, the data fusion system may be further configured to update a data repository based on the combined data set. For example, the data repository may be a local repository, a cloud storage, a website, or a remote database. In some embodiments, updating a data repository may include updating a customer accessible website to allow a user to view the combined data set.

In some embodiments, the data fusion system may be further configured to analyze the combined data set. For example, analyzing the combined data set may comprise determining a natural hazard risk score by implementing a machine learning model on the combined data. The machine learning model may include a decision tree, random forest, support vector machine, neural network model, or the like. The choice of machine learning model may depend on the specific requirements of the risk assessment and the nature of the fused data. According to various embodiments, the model may be trained on the combined data set. The trained model may be tested on a set of independent truth data to assess the accuracy and reliability of the model. For example, the trained model may be tested on a set of data separate from the combined data set to simulate real-world conditions. By comparing the model's predictions on the independent data to actual outcomes, the model's performance can be evaluated using appropriate metrics such as accuracy, precision, recall, and F1-score. Based on a poor performance result for the independent data, adjustments may be made to improve the performance of the model. Based on the performance result for the independent data being greater than a predetermined level, the machine learning model may be deployed to determine a natural hazard risk score for the combined data. Model validation may help ensure that the final model is reliable and can be trusted to make accurate predictions about risks associated with a potential natural hazard.

In some embodiments, the machine learning model may include a hazard model and a vulnerability model. For example, the hazard model may be configured to estimate an expected magnitude and frequency of a hazard event and generate a map identifying areas most likely to be affected. In some embodiments, the hazard model may be configured to identify and consider an origin of a hazard event (e.g., for earthquakes or for tracking a hurricane). The vulnerability model may be configured to take into account factors such as property data, infrastructure data, and demographics data to estimate potential damage that might result from the hazard event.

In some embodiments, the machine learning model may be configured to generate a damage curve based on the combined data. For example, the machine learning model may be trained on a labeled dataset of environmental data and natural hazard data collected from past natural hazard events to develop a relationship between the combined data set and the extent of damage caused by the hazard event. Based on the developed relationship, the machine learning model may generate a damage curve.

In some embodiments, the data fusion system may be further configured to perform one or more mitigating actions based on a result of the analysis. For example, a mitigating action may comprise turning on a sensor device of the distributed sensor network. Based on the natural hazard risk score being greater than or equal to a predetermined threshold, the data fusion system may be configured to transmit an instruction to turn on one or more sensor devices. In some embodiments, turning on a sensor device may be performed manually in-person. In some embodiments, turning on a sensor device may be performed remotely and/or automatically triggered. For example, the data fusion system may establish a secure and reliable connection with one or more sensors of the distributed multi-sensor network through a local network or remote connection. The data fusion system may be configured to access a sensor's configuration interface and may enable the power via power control within the configuration interface (e.g., by entering a command, clicking a button, or any other method to adjust a configuration). In some embodiments, accessing the sensor's configuration interface may require providing proper authentication credentials.

In some embodiments, a mitigating action may comprise altering a rate of data collection associated with one or more of the sensor devices. For example, based on the natural hazard risk score being greater than or equal to a predetermined threshold, the data fusion system may be configured to transmit an instruction to increase a rate of data collection associated with one or more of the plurality of sensor devices. In some embodiments, altering a rate of data collection may be performed manually in-person. In some embodiments altering a rate of data collection may be performed remotely and/or automatically triggered. For example, the data fusion system may establish a secure and reliable connection with one or more sensors of the distributed multi-sensor network through a local network or remote connection. The data fusion system may be configured to access a sensor's configuration interface and may change a data collection rate (e.g., sampling rate, data collection interval, or other data acquisition rate) within the configuration interface (e.g., by adjusting a numerical value, selecting a new option, or any other method to adjust a configuration). In some embodiments, accessing the sensor's configuration interface may require providing proper authentication credentials.

In some embodiments, a mitigating action may comprise recalibrating one or more sensor devices of the distributed sensor network. For example, based on the result of the fusion analysis indicating that the difference between natural hazard data and the environmental data exceeds a predetermined threshold, the data fusion system may trigger recalibration of one or more sensor devices of the distributed sensor network. In some embodiments, when remote access is available, the data fusion system may be configured to access a sensor's settings or parameters through software or firmware and adjust the settings to ensure that the sensor is providing accurate and consistent measurements. After a recalibration procedure is completed, the sensor may be tested to ensure that it is providing accurate and consistent measurements, which may include comparing the sensor's readings to reference standards or using it to measure known signals or events. In some embodiments, recalibration may be performed manually. In some embodiments, accessing the sensor's settings or parameters through software or firmware may require providing proper authentication credentials.

In some embodiments, a mitigating action may comprise adjusting a flow rate of a dam. For example, based on the natural hazard risk score being greater than or equal to a predetermined threshold, the data fusion system may be configured to transmit an instruction to adjust a flow rate of a dam. For example, adjusting a flow rate of a dam may include opening or closing spillway gates. Based on predicting that a water level may be high at a particular reservoir, the spillway gates may be opened to prepare for releasing excess water. Additionally or alternatively, adjusting a flow rate of a dam may include adjusting a gatehouse for a dam. Additionally or alternatively, for hydroelectric power plants, the flow rate may be adjusted by controlling the amount of water released from the turbine. Adjusting a flow rate of a dam may be performed through remote control or may be performed manually in-person. In some embodiments, a flow rate of a dam may automatically be adjusted in response to the natural hazard risk score being greater than or equal to a predetermined threshold.

Disclosed embodiments may include any one of the following bullet-pointed features alone or in combination with one or more other bullet-pointed features, whether implemented as a method, by at least one processor, and/or stored as executable instructions on non-transitory computer-readable media:

receiving localized data from a distributed multi-sensor network;

wherein the distributed multi-sensor network includes a plurality of sensor devices associated with a community;

receiving property data, community infrastructure data and environmental data from at least one external repository;

generating combined data using data fusion, the combined data being based on the localized data from the distributed multi-sensor network and at least one of the property data, community infrastructure data or the environmental data;

determining a community risk score for a natural hazard by implementing a machine learning method on the combined data;

performing a mitigating action based on the community risk score;

wherein property data includes at least one of an indication of a building condition, a building material, a building age, or a building height;

wherein environmental data includes at least one of precipitation data, moisture data, storm surge data, wind data, temperature data, pressure data, or GPS data;

wherein the mitigating action comprises turning on a sensor device of the plurality of sensor devices;

wherein the mitigating action comprises altering a rate of data collection associated with one or more of the plurality of sensor devices;

wherein the mitigating action comprises deploying a drone to collect data associated with the community;

wherein the mitigating action comprises deploying personnel;

wherein the mitigating action comprises initiating an evacuation;

wherein initiating an evacuation comprises sending an alert;

wherein the mitigating action comprises adjusting a flow rate of a dam;

wherein the mitigating action comprises deploying an automated flood mitigation system;

generating a visualization;

generating a heatmap;

updating one or more hydrological routing models;

updating one or more digital urban planning maps;

determining a depth and a slope based on an image;

assessing a damage risk based on the determined depth or slope;

wherein the community risk score is based on the damage risk;

wherein one or more sensor devices of the plurality of sensor devices comprises a rain gauge;

adjusting a setting of one or more of the plurality of sensors based on the natural hazard risk score;

receiving natural hazard data from a distributed sensor network, the natural hazard data being associated with a region of the earth;

identifying a hazard event based on the natural hazard data;

causing a satellite to alter a flyover path and collect data over the region of the earth;

receiving environmental data collected by the satellite based on the altered flyover path;

performing a fusion analysis to generate a combined data set based on the natural hazard data and the environmental data;

wherein the natural hazard data includes real time data collected by one or more multi-sensor devices of the distributed sensor network;

wherein the natural hazard data includes at least one of elevation data, precipitation data, moisture data, storm surge data, wind data, temperature data, pressure data, or GPS data;

wherein the environmental data comprises a time series, the time series being gathered in flyovers by one or more data collection satellites, the one or more data collection satellites comprising the satellite;

wherein the fusion analysis includes implementing a machine learning model to interpolate the time series;

wherein the machine learning model comprises a neural network;

wherein the environmental data collected by the satellite includes at least one of precipitation data, temperature data, flood depth data, extent data, fire extent data, vegetation cover data, moisture data, or image data;

wherein the fusion analysis includes spatial interpolation using spatial data and temporal data;

calibrating the environmental data using the natural hazard data;

wherein the combined data set is based on the calibrated environmental data;

updating a data repository based on the combined data set;

analyzing the combined data set;

performing a mitigating action based on a result of the analysis;

wherein analyzing the combined data set comprises determining a natural hazard risk score by implementing a machine learning model on the combined data;

wherein the machine learning model includes a hazard model and a vulnerability model;

wherein the machine learning model is configured to generate a damage curve based on the combined data;

wherein the mitigating action comprises turning on a sensor device of the distributed sensor network;

wherein the mitigating action comprises altering a rate of data collection associated with one or more of the sensor devices;

wherein the mitigating action comprises recalibrating one or more sensor devices of the distributed sensor network;

wherein the mitigating action comprises adjusting a flow rate of a dam;

The embodiments may further be described using the following clauses:

Clause Set A:

1. A computerized data fusion method for processing data from satellites and distributed sensor networks, comprising:

receiving natural hazard data from a distributed sensor network, the natural hazard data being associated with a region of the earth;

identifying a hazard event based on the natural hazard data;

causing a satellite to alter a flyover path and collect data over the region of the earth;

receiving environmental data collected by the satellite based on the altered flyover path; and performing a fusion analysis to generate a combined data set based on the natural hazard data and the environmental data.

2. The computerized data fusion method of clause A1, wherein the natural hazard data includes real time data collected by one or more multi-sensor devices of the distributed sensor network.

3. The computerized data fusion method of clause A1, wherein the natural hazard data includes at least one of elevation data, precipitation data, moisture data, storm surge data, wind data, temperature data, pressure data, or GPS data.

4. The computerized data fusion method of clause A1, wherein the environmental data comprises a time series, the time series being gathered in flyovers by one or more data collection satellites, the one or more data collection satellites comprising the satellite.

5. The computerized data fusion method of clause A4, wherein the fusion analysis includes implementing a machine learning model to interpolate the time series.

6. The computerized data fusion method of clause A5, wherein the machine learning model comprises a neural network.

7. The computerized data fusion method of clause A1, wherein the environmental data collected by the satellite includes at least one of precipitation data, temperature data, flood depth data, extent data, fire extent data, vegetation cover data, moisture data, or image data.

8. The computerized data fusion method of clause A1, wherein the fusion analysis includes spatial interpolation using spatial data and temporal data.

9. The computerized data fusion method of clause A1, the method further comprising:
calibrating the environmental data using the natural hazard data, and
wherein the combined data set is based on the calibrated environmental data.

10. The computerized data fusion method of clause A1, the method further comprising:
updating a data repository based on the combined data set.

11. The computerized data fusion method of clause A1, the method further comprising:
analyzing the combined data set; and
performing a mitigating action based on a result of the analysis.

12. The computerized data fusion method of clause A11, wherein analyzing the combined data set comprises determining a natural hazard risk score by implementing a machine learning model on the combined data.

13. The computerized data fusion method of clause A12, wherein the machine learning model includes a hazard model and a vulnerability model.

14. The computerized data fusion method of clause A12, wherein the machine learning model is configured to generate a damage curve based on the combined data.

15. The computerized data fusion method of clause A11, wherein the mitigating action comprises turning on a sensor device of the distributed sensor network.

16. The computerized data fusion method of clause A11, wherein the mitigating action comprises altering a rate of data collection associated with one or more of the sensor devices.

17. The computerized data fusion method of clause A11, wherein the mitigating action comprises recalibrating one or more sensor devices of the distributed sensor network.

18. The computerized data fusion method of clause A11, wherein the mitigating action comprises adjusting a flow rate of a dam.

19. A data fusion system for processing data from satellites and distributed sensor networks, the system comprising;
one or more memory units storing instructions; and
one or more processors configured to execute the instructions to perform operations comprising:
receiving natural hazard data from a distributed sensor network, the natural hazard data being associated with a region of the earth;
identifying a hazard event based on the natural hazard data;
causing a satellite to alter a flyover path and collect data over the region of the earth;
receiving environmental data collected by the satellite based on the altered flyover path; and
performing a fusion analysis to generate a combined data set based on the natural hazard data and the environmental data.

20. A non-transitory computer-readable medium having stored thereon computer-readable instructions that, when executed by a processor, cause the processor to execute a data fusion method for processing data from satellites and distributed sensor networks, the data fusion method comprising:
receiving natural hazard data from a distributed sensor network, the natural hazard data being associated with a region of the earth;

identifying a hazard event based on the natural hazard data;
causing a satellite to alter a flyover path and collect data over the region of the earth;
receiving environmental data collected by the satellite based on the altered flyover path; and
performing a fusion analysis to generate a combined data set based on the natural hazard data and the environmental data.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:
1. A computerized method for community-based multi-sensor fused data processing to determine natural hazard risk, the method comprising:
receiving, at an event server, localized data from a distributed multi-sensor network, the distributed multi-sensor network including a plurality of sensor devices associated with a community;
receiving, at the event server, property data, community infrastructure data and environmental data from at least one external repository;
generating, by the event server, combined data using data fusion, the combined data being based on the localized data from the distributed multi-sensor network and at least one of the property data, community infrastructure data or the environmental data;

determining, by the event server, a community risk score for a natural hazard by implementing a machine learning method on the combined data; and performing, by the event server, a mitigating action based on the community risk score.

2. The computerized method of claim 1, wherein property data includes at least one of an indication of a building condition, a building material, a building age, or a building height.

3. The computerized method of claim 1, wherein environmental data includes at least one of precipitation data, moisture data, storm surge data, wind data, temperature data, pressure data, or GPS data.

4. The computerized method of claim 1, wherein the mitigating action comprises turning on a sensor device of the plurality of sensor devices.

5. The computerized method of claim 1, wherein the mitigating action comprises altering a rate of data collection associated with one or more of the plurality of sensor devices.

6. The computerized method of claim 1, wherein the mitigating action comprises deploying a drone to collect data associated with the community.

7. The computerized method of claim 1, wherein the mitigating action comprises deploying personnel.

8. The computerized method of claim 1, wherein the mitigating action comprises initiating an evacuation.

9. The computerized method of claim 8, wherein initiating an evacuation comprises sending an alert.

10. The computerized method of claim 1, wherein the mitigating action comprises adjusting a flow rate of a dam.

11. The computerized method of claim 1, wherein the mitigating action comprises deploying an automated flood mitigation system.

12. The computerized method of claim 1, wherein the method further comprises generating a visualization.

13. The computerized method of claim 1, wherein the method further comprises generating a heatmap.

14. The computerized method of claim 1, wherein the method further comprises updating one or more hydrological routing models.

15. The computerized method of claim 1, wherein the method further comprises updating one or more digital urban planning maps.

16. The computerized method of claim 1, wherein the method further comprises determining a depth and a slope based on an image, and assessing a damage risk based on the determined depth or slope, and wherein the community risk score is based on the damage risk.

17. The computerized method of claim 1, wherein one or more sensor devices of the plurality of sensor devices comprises a rain gauge.

18. The computerized method of claim 1, further comprising adjusting a setting of one or more of the plurality of sensors based on the natural hazard risk score.

19. A system for community-based multi-sensor fused data processing to determine natural hazard risk, the system comprising:

one or more memory units storing instructions; and one or more processors configured to execute the instructions to perform operations comprising:

receiving localized data from a distributed multi-sensor network, the distributed multi-sensor network including a plurality of sensor devices associated with a community;

receiving property data, community infrastructure data and environmental data from at least one external repository;

generating combined data using data fusion, the combined data being based on the localized data from the distributed multi-sensor network and at least one of the property data, community infrastructure data or the environmental data;

determining a community risk score for a natural hazard by implementing a machine learning method on the combined data; and performing a mitigating action based on the community risk score.

20. A non-transitory computer-readable medium having stored thereon computer-readable instructions that, when executed by a processor, cause the processor to execute a method for community-based multi-sensor fused data processing to determine natural hazard risk, the method comprising:

receiving, at an event server, localized data from a distributed multi-sensor network, the distributed multi-sensor network including a plurality of sensor devices associated with a community;

receiving, at the event server, property data, community infrastructure data and environmental data from at least one external repository;

generating, by the event server, combined data using data fusion, the combined data being based on the localized data from the distributed multi-sensor network and at least one of the property data, community infrastructure data or the environmental data;

determining, by the event server, a community risk score for a natural hazard by implementing a machine learning method on the combined data; and performing, by the event server, a mitigating action based on the community risk score.

*     *     *     *     *